United States Patent
Demsky et al.

(10) Patent No.: US 7,260,746 B2
(45) Date of Patent: Aug. 21, 2007

(54) SPECIFICATION BASED DETECTION AND REPAIR OF ERRORS IN DATA STRUCTURES

(75) Inventors: Brian C. Demsky, Cambridge, MA (US); Martin C. Rinard, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 318 days.

(21) Appl. No.: 10/723,252

(22) Filed: Nov. 26, 2003

(65) Prior Publication Data

US 2005/0086562 A1   Apr. 21, 2005

Related U.S. Application Data

(60) Provisional application No. 60/513,140, filed on Oct. 21, 2003.

(51) Int. Cl.
*G06F 11/00* (2006.01)

(52) U.S. Cl. .............. 714/38; 714/37; 714/43

(58) Field of Classification Search ............ 714/42, 714/38, 37, 43
See application file for complete search history.

(56) References Cited

U.S. PATENT DOCUMENTS

| | | | | | |
|---|---|---|---|---|---|
| 5,291,494 | A | * | 3/1994 | Bruckert et al. | 714/24 |
| 5,301,287 | A | * | 4/1994 | Herrell et al. | 711/202 |
| 5,590,329 | A | * | 12/1996 | Goodnow et al. | 717/144 |
| 5,838,979 | A | * | 11/1998 | Hart et al. | 717/146 |
| 5,854,924 | A | * | 12/1998 | Rickel et al. | 717/132 |
| 5,999,731 | A | * | 12/1999 | Yellin et al. | 717/126 |
| 6,038,378 | A | * | 3/2000 | Kita et al. | 714/38 |
| 6,247,171 | B1 | * | 6/2001 | Yellin et al. | 717/126 |
| 6,377,950 | B1 | * | 4/2002 | Peters et al. | 707/10 |
| 6,636,994 | B1 | * | 10/2003 | Waschura et al. | 714/704 |
| 2002/0059260 | A1 | * | 5/2002 | Jas | 707/100 |
| 2003/0126590 | A1 | * | 7/2003 | Burrows et al. | 717/154 |
| 2003/0188231 | A1 | * | 10/2003 | Cronce | 714/52 |
| 2004/0015876 | A1 | * | 1/2004 | Applin | 717/127 |
| 2004/0030780 | A1 | * | 2/2004 | Walters | 709/225 |
| 2004/0153827 | A1 | * | 8/2004 | Schwabe | 714/38 |
| 2005/0038832 | A1 | * | 2/2005 | Feigenbaum | 707/202 |
| 2005/0060317 | A1 | * | 3/2005 | Lott et al. | 707/10 |
| 2005/0076266 | A1 | * | 4/2005 | Costin | 714/38 |

OTHER PUBLICATIONS

Demsky et al. "Role-Based Exploration of Object Oriented Programs" ACM 2002.*

(Continued)

*Primary Examiner*—Bryce P. Bonzo
(74) *Attorney, Agent, or Firm*—Muirhead and Saturnelli, LLC

(57) ABSTRACT

Described are techniques used for detection of inconsistent data structures. The state of a data structure is determined as "inconsistent" in accordance with a defined specification. In the event that a data structure is determined to be inconsistent, the data structure may be repaired. In the event that the repair fails in connection with a read or a write operation, the executing program may optionally take steps to allow the program to continue execution. In connection with a read operation, any value may be returned as a result of the read. In connection with a write operation, the data to be written is discarded such that no write of data is performed and program execution continues. The detection and repairs are determined in accordance with user specifications.

68 Claims, 28 Drawing Sheets

OTHER PUBLICATIONS

Rinard, Martin "An Integrated Synchronsization and Consistency Protocol for IMplementation of a High-Level Parallel Programming Language" IEEE 1996.*
Jonathan D. Bright, et al., On-line Error Monitoring for Several Data Structures, AT&T Bell Laboratories, Murray Hill, New Jersey 07974, Computer Science Department, Johns Hopkins University, Baltimore, Maryland 21218, 10 pages.
Stefano Porcarelli, et al., Tuning of database audits to improve scheduled maintenance in communication systems, Univ. of Pisa, Computer Engineering Dep., Via Diotisalvi 2,I-56126, Pisa, Italy, Stefano.porcarelli@guest, cnuce.cnr.it; IEI/CNR, Via Moruzzi I, I-56100, Pisa, Italy {digiandomenico, chohra}@iei.pi.cnr.it; Univ. of Firenze, Dip. Sistemi e Informatica, V. Lombroso 6/17, I-50134, Firenza, Italy, andrea.bondavalli@cnuce.cnr.it, 10 pages.
Jim Gray, et al., The Recovery Manager of the System R Database Manager, Computing Surveys, vol. 13, No. 2, Jun. 1981, pp. 223-242.
P.J. Plauger, Chocolate, Mar. 1994, Embedded Systems Programming 81, 3 pages.
Michael Sannella, et al., Multi-way Versus One-way Constraints in User Interfaces: Experience with the DeltaBlue Algorithm; Technical Report 92-07-05a, Dept. of Computer Science and Engineering, University of Washington, May 1993, 38 pages.
Chung-Chi Jim Li, et al., Local Concurrent Error Detection and Correction in Data Structures Using Virtual Backpointers, IEEE Transactions on Computers, vol. 38, No. 11, Nov. 1989, pp. 1481-1482.
David Garlan, et al., Model-based Adaptation for Self-Healing Systems, School of Computer Science, Carnegie Mellon University, Pittsburgh, PA USA, garland@cs.cmu.edu, 6 pages.
Jonathan D. Bright, et al., Checking the Integrity of Trees, 10 pages.
G. Haugk, et al., Maintenance Capabilities, AT&T Technical Journal, vol. 64, No. 6, Jul.-Aug. 1985, pp. 1385-1416.
Samiha Mourad, et al., On the Reliability of the IBM MVS/XA Operating System, Concise Papers, IEEE Transactions on Software Engineering, vol. SE-13, No. 10, Oct. 1987, pp. 1135-1139.
Robert E. Strom, et al., Typestate: A Programming Language Concept for enhancing Software Reliability, IEEE Transactions on Software Engineering, vol. SE-12, No. 1, Jan. 1986, pp. 157-171.
David J. Taylor, et al., Principles of Data Structure Error Correction, IEEE Transactions on Computers, vol. C-31, No. 7, Jul. 1982, pp. 602-608.
Manuvir Das, et al., ESP: Path-Sensitive Program Verification in Polynomial Time, PLDI'02, Jun. 17-19, 2002, Berlin, Germany, pp. 57-68.
David Patterson, et al., Recovery Oriented Computing (ROC): Motivation, Definition, Techniques, and Case Studies, Computer Science Technical Report UCS/CSD-02-1175, U.C. Berkeley, Mar. 15, 2002, 16 pages.
Neeraj K. Gupta, et al., Auditdraw: Generating Audits the FAST Way, pp. 1-10.
Stefano Ceri, et al., automatic Generation of Production Rules for Integrity Maintenance, ACM Transactions on Database Systems, vol. 19, No. 3, Sep. 1994, pp. 367-422.
Aaron B. Brown, et al., Undo for Operators: Building an Undoable E-mail Store, University of California, Berkeley, EECS, Computer Science Division, 387 Soda Hall, #1776, Berkeley, CA, 94720-1776, USA {abrown, patterson}@cs.berkeley.edu, Jun. 2003, 14 pages.
George Candea, et al., Recursive Restartability: Turning the Reboot Sledgehammer into a Scalpel, Appears in Proceedings of the 8th Workshop on Hot Topics in Operating Systems (HotOS-VIII), May 2001, 6 pages.
Stefano Ceri, et al., Deriving Production Rules for Constraint Maintenance, Proc. of 1990 VLDB Conference, pp. 566-577.
David G. Clarke, et al., Ownership Types for Flexible Alias Protection, Microsoft Research Institute, Macquarie University, Sydney, Australia {clad.potter,kjx}@mri.mq.edu.au, 17 pages.
Susan D. Urban, et al., Constraint Analysis: A Design process for Specifying Operations on Objects, IEEE Transactions on Knowledge and Data Engineering, vol. 2, No. 4, Dec. 1990, pp. 391-400.
James C. Corbett, et al., Bandera: Extracting Finite-state models from java Source Code, University of Hawai'i Department of Information, and Computer Science, Honolulu, HI 96822, Corbett@hawaii.edu, 10 pages.
Martin C. Rinard, Credible Compilation, Laboratory for Computer Science, Massachusetts Institute of Technology, Cambridge, MA 02139, Mar. 10, 1999, 38 pages.
James R. Larus, et al., EEL: Machine-Independent Executable Editing, Computer Sciences Department, University of Wisconsin-Madison, 1210 West Dayton Street, Madison, WI 53706, USA, {larus,schnarr}@cs.wisc.edu., pp. 291-300.
Michael d. Ernst, et al., Quickly Detecting Relevant Program Invariants, University of Washington Technical Report UW-CSE-99-11-01, Nov. 15, 1999, 12 pages.
Timothy Griffin, et al., Generating Update Constraints from PRL5.0 Specifications, AT&T Bell laboratories, Jul. 12, 1996, 10 pages.
Brian Demsky, et al., Role-Based Exploration of Object-Oriented Programs, Laboratory for Computer Science, Massachusetts Institute of Technology, Cambridge, MA 02139, bdemsky@mit.edu, 12 pages.
Daniel Jackson, Alloy: A Lightweight Object Modelling Notation, Laboratory for Computer Science, Massachusetts Institute of Technology, Nov. 27, 2001, 32 pages.
Gregor Kiczales, et al., Aspects-Oriented programming, Jun. 1997, 25 pages.
Abstract—Viktor Kuncak, et al., Role Analysis, POPL '02, Jan. 16-18, 2002, Portland, OR USA; 16 pages.
David A. Ladd, et al., Two Application Languages in Software Production, AT&T Bell Laboratories, 9 pages.
Christian Nentwich, et al., consistency Management with Repair Actions, Department of Computer Science, University College London, Gower Street, London WC1E 6BT,UK {c.nentwich, w.em-merich,a.finkelstein}@cs.ucl.ac.uk, 10 pages.
Susan S. Brilliant, et al., Analysis of Faults I a Multi-Version Software Experiment, Department of Computer Science, University of Virginia, Charlottesville, Virginia 22903, 36 pages.
Chandrasekhar Boyapati, et al., Ownership Types for Safe programming: Preventing Data Races and Deadlocks, OOPSLA '02, Nov. 4-8, 2002, Seattle, Washington, USA, pp. 211-230.
Timothy L. Kay, et al., Ray Tracing Complex Scenes, Dallas, Aug. 18-22, vol. 20, No. 4, 1986, pp. 269-278.
Martin C. Rinard, et al., Credible Compilation with Pointers, Laboratory for computer Science, Massachusetts Institute of Technology, Cambridge, MA 02139, {rinard,marinov}@lcs.mit.edu, 20 pages.
Beverly D. Sanford, et al., Center/Traconautomation system: Development and Evaluation in the Field, 38th Annual air Traffic Control Association Conference Proceedings. Oct. 1993, pp. 238-245.
Edsger W. Dijkstra, Self-stabilizing Systems in Spite of Distributed Control, Communications of the ACM, Nov. 1974, vol. 17, No. 11, pp. 643-644.
Daniel Jackson, et al., Software Analysis: A Roadmap, Future of Sofware Engineering, Limerick Ireland, 2000, 133-145 pages.
Seth Hallem, et al., A System and Language for Building System-Specific, Static Analyses, PLDI'02, Jun. 17-19, 2002, Berlin, Germany, pp. 69-82.
Pete Broadwell, et al., Fig A Prototype Tool for Online Verification of Recovery Mechanisms, ICS Shaman Workshop, '02, New York, New York, USA, 7 pages.
Albert D. Alexandrov, et al., Ufo: A Personal Global File System Based on User-Level Extensions to the Operating System, ACM Transactions on Computer Systems, vol. 16, No. 3, Aug. 1998, pp. 207-233.
Jong-Deok Choi, et al., Efficient and Precise Datarace Detection for Multithreaded Object-Oriented Programs, PLDI'02, Jun. 17-19, 2002, Berlin, Germany, pp. 258-269.
Abstract—Brian Demsky, et al., Automatic Data Structure Repair for Self-Healing Systems, First Workshop on Algorithms and Architectures for Self-Managing System, Jun. 2003, 6 pages.
Brian Demsky, et al., Static Specification Analysis for Termination of Specification-Based Data Structure Repair, The 14th IEEE International Symposium of Software Reliability Engineering, Nov. 2003, 14 pages.

Artin Rinard, et al., Acceptability-Oriented Computing, OOPSLA '03, Oct. 26-30, 2003, 19 pages.

Abstract—Brian Demsky, et al., Automatic Detection and Repair of Errors in Data Structures, OOPSLA '03, Oct. 26-30, 2003, Anaheim, California, USA, 18 pages.

Abstract—Brian Demsky, et al., Automatic Detection and Repair of Errors in Data Structures, MIT LCS Technical Repair 875, Dec. 2002, 10 pages.

Martin Rinard, et al., Automatic Detection and Repair of Errors in Data Structures, NDIST Workshop, Dec. 10, 2002, 38 pages.

Martin Rinard, et al., Automatic Detection and Repair of Errors in Data Structures, National University of Singapore, Presentation, Dec. 23, 2002, 40 pages.

Martin Rinard, et al., Automatic Detection and Repair of Errors in Data Structures, Self Managing Systems Workshop, Jun. 11, 2003, 47 pages.

* cited by examiner

122 structdefn    ::=   struct structurename
                    (subtypes structurename) { fielddefn* } fielddefn     ::=   type field; | reserved type; |
                    type field[E]; |
                    reserved type[E];

type          ::=   boolean | byte | short | int | structurename |
                    structurename *

E             ::=   `V | number | string | E.field |
                    E.field[E] | E − E | E + E | E/E | E * E

Structure Definition Language

FIGURE 6

```
struct Entry {
    byte name[Length];
    byte valid;
    int  size;
    int  first;
}
struct Block { data byte[BlockSize]; }
struct Disk {
    Entry table[NumEntries];
    int FAT[NumBlocks];
    Block block[NumBlocks];
}
```

FIGURE 7   Structure Declarations set S of T : Partition $S_1, ..., S_n$
relation R : $S_1 \rightarrow S_n$

{ 125

FIGURE 8A set blocks of integer : partition used | free
relation next : used -> used;

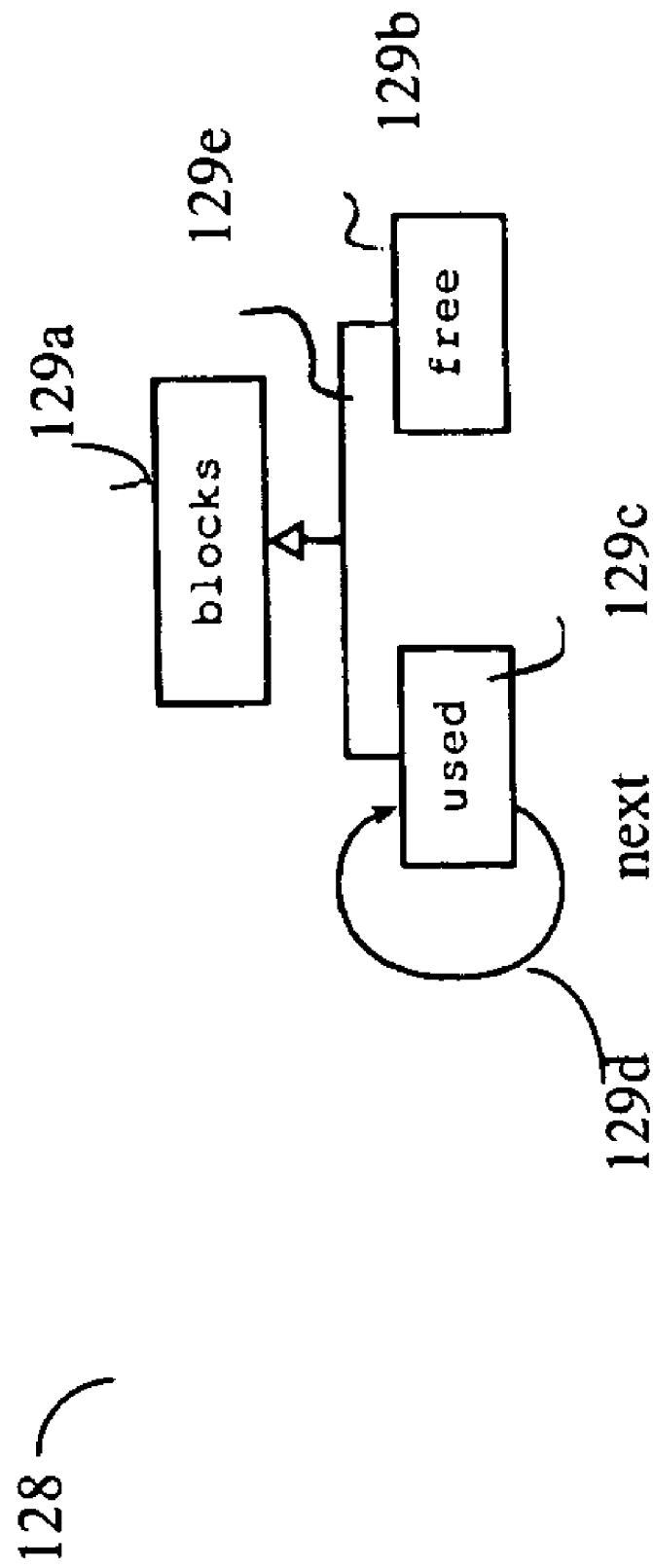
FIGURE 9  Graphical Representation of Object and Relation Declarations $C ::= Q, C \mid G \Rightarrow I$ $Q ::= \text{for } V \text{ in } S \mid \text{for } \langle V, V \rangle \text{ in } R \mid$
$\quad \text{for } V = E .. E$ $G ::= G \text{ and } G \mid G \text{ or } G \mid !G \mid E = E \mid E < E \mid \text{true} \mid$
$\quad (G) \mid E \text{ in } S \mid \langle E, E \rangle \text{ in } R$ $I ::= E \text{ in } S \mid \langle E, E \rangle \text{ in } R$ $E ::= V \mid \text{number} \mid \text{string} \mid E.\text{field} \mid$
$\quad E.\text{field}[E] \mid E - E \mid E + E \mid E/E \mid E * E$

FIGURE 10     Model Definition Language

130

$hv \in$ HeapValue = Bit ∪ Byte ∪ Short ∪ Integer ∪ Struct
$h \in$ Heap = $\mathcal{P}$(Object × Field × HeapValue ∪ Object × Field × N × HeapValue)
$v \in$ Value = Z ∪ Boolean ∪ string ∪ Struct
$l \in$ Local = Var → Value
$s \in$ Store = Value × Value ∪ Value
$m \in$ Model = $\mathcal{P}$(Var × Store)
$\mathcal{R}$ : C → Heap → Local → Model → Model
$\mathcal{E}$ : E → Heap → Local → Model → Value
$\mathcal{G}$ : G → Heap → Local → Model → Boolean
$\mathcal{I}$ : I → Heap → Local → Model → Model $\mathcal{R}[\![\text{for } V \text{ in } S, C]\!] \, h \, l \, m = \bigcup_{v \in m(S)} \mathcal{R}[\![C]\!] \, h \, l[V \mapsto v] \, m$
$\mathcal{R}[\![\text{for } (V_1, V_2) \text{ in } R, C]\!] \, h \, l \, m = \bigcup_{(v_1, v_2) \in m(R)} \mathcal{R}[\![C]\!] \, h \, l[V_1 \mapsto v_1][V_2 \mapsto v_2] \, m$
$\mathcal{R}[\![\text{for } V = E_1 \ldots E_2, C]\!] \, h \, l \, m = \bigcup_{i=\mathcal{E}[\![E_1]\!] h l m}^{\mathcal{E}[\![E_2]\!] h l m} \mathcal{R}[\![C]\!] \, h \, l[V \mapsto i] \, m$
$\mathcal{R}[\![C \Rightarrow I]\!] \, h \, l \, m = \text{if } (\mathcal{G}[\![G]\!] \, h \, l \, m) \text{ then } (\mathcal{I}[\![I]\!] \, h \, l \, m) \text{ else } m$
$\mathcal{G}[\![C_1 \text{ and } C_2]\!] \, h \, l \, m = (\mathcal{G}[\![G_1]\!] \, h \, l \, m) \wedge (\mathcal{G}[\![G_2]\!] \, h \, l \, m)$
$\mathcal{G}[\![C_1 \text{ or } C_2]\!] \, h \, l \, m = (\mathcal{G}[\![G_1]\!] \, h \, l \, m) \vee (\mathcal{G}[\![G_2]\!] \, h \, l \, m)$
$\mathcal{G}[\![!G]\!] \, h \, l \, m = \neg(\mathcal{G}[\![G]\!] \, h \, l \, m)$
$\mathcal{G}[\![E_1 = E_2]\!] \, h \, l \, m = (\mathcal{E}[\![E_1]\!] \, h \, l \, m) == (\mathcal{E}[\![E_2]\!] \, h \, l \, m)$
$\mathcal{G}[\![E_1 < E_2]\!] \, h \, l \, m = (\mathcal{E}[\![E_1]\!] \, h \, l \, m) < (\mathcal{E}[\![E_2]\!] \, h \, l \, m)$
$\mathcal{G}[\![\text{true}]\!] \, h \, l \, m = \text{true}$
$\mathcal{G}[\![E \text{ in } S]\!] \, h \, l \, m = (S, \mathcal{E}[\![E]\!] \, h \, l \, m) \in m$
$\mathcal{G}[\![(E_1, E_2) \text{ in } R]\!] \, h \, l \, m = (R, (\mathcal{E}[\![E_1]\!] \, h \, l \, m, \mathcal{E}[\![E_2]\!] \, h \, l \, m)) \in m$
$\mathcal{I}[\![E \text{ in } S]\!] \, h \, l \, m = m \cup (S, \mathcal{E}[\![E]\!] \, h \, l \, m)$
$\mathcal{I}[\![(E_1, E_2) \text{ in } R]\!] \, h \, l \, m = m \cup (R, (\mathcal{E}[\![E_1]\!] \, h \, l \, m, \mathcal{E}[\![E_2]\!] \, h \, l \, m))$
$\mathcal{E}[\![V]\!] \, h \, l \, m = l(V)$
$\mathcal{E}[\![\text{number}]\!] \, h \, l \, m = \text{number}$
$\mathcal{E}[\![E.\text{field}]\!] \, h \, l \, m = b \text{ such that } ((\mathcal{E}[\![E_1]\!] \, h \, l \, m), \text{field}, b) \in h$
$\mathcal{E}[\![E_1.\text{field}[E_2]]\!] \, h \, l \, m =$
  $c \text{ such that } ((\mathcal{E}[\![E_1]\!] \, h \, l \, m), \text{field}, (\mathcal{E}[\![E_2]\!] \, h \, l \, m), c) \in h$
$\mathcal{E}[\![E_1 \oplus E_2]\!] \, h \, l \, m = primop(\oplus, (\mathcal{E}[\![E_1]\!] \, h \, l \, m), (\mathcal{E}[\![E_2]\!] \, h \, l \, m))$
$\mathcal{E}[\![\text{string}]\!] \, h \, l \, m = \text{string}$ FIGURE 11 Denotational Semantics for Model Definition Language

```
Disk disk;

for i in 0..NumEntries, disk.table[i].valid &&
    disk.table[i].first < NumBlocks =>
    disk.table[i].first in used;
for b in used, 0 <= disk.FAT[b] &&
    disk.FAT[b] < NumBlocks => disk.FAT[b] in used;
for b in used, 0 <= disk.FAT[b] &&
    disk.FAT[b] < NumBlocks =>
    <b,disk.FAT[b]> in next;
for b in 0..NumBlocks, !(b in used) => b in free;
```

FIGURE 12A    Model Definition Declarations and Rules

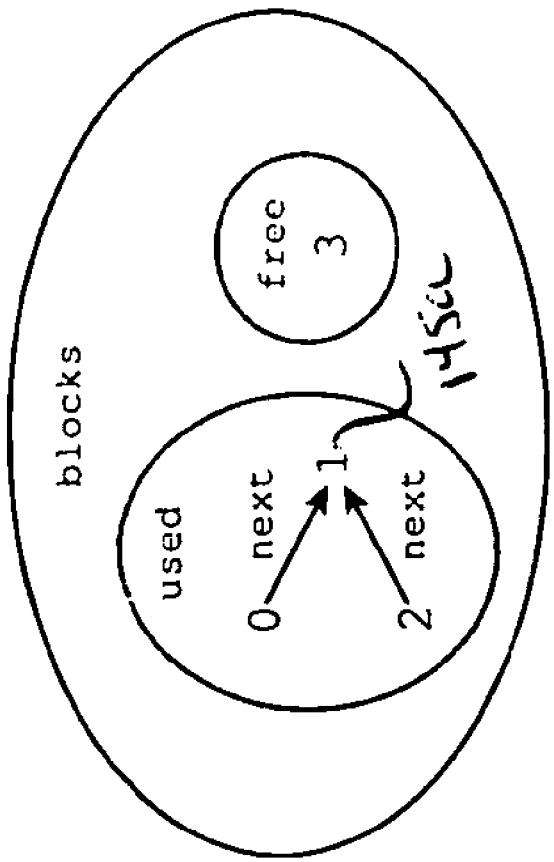
FIGURE 13B  Inconsistent Model $$C := Q, C \mid B$$
$$Q := \text{for } V \text{ in } S \mid \text{for } V = E \mathrel{..} E$$
$$B := B \text{ and } B \mid B \text{ or } B \mid !B \mid (B) \mid$$
$$VE = E \mid VE < E \mid VE <= E \mid VE > E \mid$$
$$VE >= E \mid V \text{ in } SE \mid \text{size}(SE) = C \mid$$
$$\text{size}(SE) >= C \mid \text{size}(SE) <= C$$
$$VE := V.R$$
$$E := V \mid number \mid string \mid E + E \mid E - E \mid E/E \mid$$
$$E * E \mid E.R \mid \text{size}(SE) \mid (E)$$
$$SE := S \mid V.R \mid R.V$$

Figure 13 Internal Constraint Language

138

$v \in \text{Value} = \text{Number} \cup \text{Boolean} \cup \text{string} \cup \text{Object}$ $l \in \text{Local} = \mathcal{P}(\text{Var} \times \text{Value})$ $m \in \text{Model} = \mathcal{P}(\text{Var} \times \text{Store})$ $s \in \text{Store} = \text{Value} \times \text{Value} \cup \text{Value}$ $\mathcal{EV} : C \rightarrow \text{Local} \rightarrow \text{Model} \rightarrow \text{Boolean}$ $\mathcal{E} : E \rightarrow \text{Local} \rightarrow \text{Model} \rightarrow \text{Value}$ $\mathcal{C} : B \rightarrow \text{Local} \rightarrow \text{Model} \rightarrow \text{Boolean}$ $\mathcal{V} : VE \rightarrow \text{Local} \rightarrow \text{Model} \rightarrow \text{Value}$ $\mathcal{SE} : SE \rightarrow \text{Local} \rightarrow \text{Model} \rightarrow \mathcal{P}(\text{Value})$ $\mathcal{EV}[\text{for } V \text{ in } S, C] \, l \, m = \bigwedge_{v \in m(S)} \mathcal{EV}[C] \, l[V \mapsto v] \, m$ $\mathcal{EV}[\text{for } V = E_1..E_2, C] \, l \, m = \bigwedge_{v=\mathcal{E}[E_1] \, l \, m}^{\mathcal{E}[E_2] \, l \, m} \mathcal{EV}[C] \, l[V \mapsto v] \, m$ $\mathcal{EV}[B] \, l \, m = \mathcal{C}[B] \, l \, m$ $\mathcal{C}[!B] \, l \, m = \neg \mathcal{C}[B] \, l \, m$ $\mathcal{C}[B_1 \text{ and } B_2] \, l \, m = \mathcal{C}[B_1] \, l \, m \wedge \mathcal{C}[B_2] \, l \, m$ $\mathcal{C}[B_1 \text{ or } B_2] \, l \, m = \mathcal{C}[B_1] \, l \, m \vee \mathcal{C}[B_2] \, l \, m$ $\mathcal{C}[V \text{ in } SE] \, l \, m = l(V) \in \mathcal{SE}[SE] \, l \, m$ $\mathcal{C}[VE = E] \, l \, m = \mathcal{V}[VE] \, l \, m == \mathcal{E}[E] \, l \, m$ $\mathcal{C}[VE < E] \, l \, m = \mathcal{V}[VE] \, l \, m < \mathcal{E}[E] \, l \, m$ $\mathcal{C}[VE <= E] \, l \, m = \mathcal{V}[VE] \, l \, m \leq \mathcal{E}[E] \, l \, m$ $\mathcal{C}[VE > E] \, l \, m = \mathcal{V}[VE] \, l \, m > \mathcal{E}[E] \, l \, m$ $\mathcal{C}[VE >= E] \, l \, m = \mathcal{V}[VE] \, l \, m \geq \mathcal{E}[E] \, l \, m$ $\mathcal{C}[\text{size}(SE) = C] \, l \, m = \mathcal{E}[\text{size}(SE)] \, l \, m == C$ $\mathcal{C}[\text{size}(SE) >= C] \, l \, m = \mathcal{E}[\text{size}(SE)] \, l \, m \geq C$ $\mathcal{C}[\text{size}(SE) <= C] \, l \, m = \mathcal{E}[\text{size}(SE)] \, l \, m \leq C$ $\mathcal{V}[V.R] \, l \, m = y \text{ such that } (l(V), y) \in m(R)$ $\mathcal{E}[\text{size}(SE)] \, l \, m = |\mathcal{SE}[SE] \, l \, m|$ $\mathcal{E}[V] \, l \, m = l(V)$ $\mathcal{E}[E.R] \, l \, m = y \text{ such that } \exists z, z \in \mathcal{E}[E] \, l \, m \wedge (z, y) \in m(R)$ $\mathcal{E}[E_1 \oplus E_2] \, l \, m = \text{primop}(\oplus, \mathcal{E}[E_1] \, l \, m, \mathcal{E}[E_2] \, l \, m)$ $\mathcal{SE}[S] \, l \, m = \{s \mid s \in m(S)\}$ $\mathcal{SE}[V.R] \, l \, m = \{y \mid (l(V), y) \in m(R)\}$ $\mathcal{SE}[R.V] \, l \, m = \{y \mid (y, l(V)) \in m(R)\}$ Figure 14 Denotational Semantics for Internal Constraint Language $R ::= Q, R \mid G \Rightarrow C$ $Q ::= \text{for } V \text{ in } S \mid \text{for } (V, V) \text{ in } R \mid \text{for } V = E .. E$ $G ::= G \text{ and } G \mid G \text{ or } G \mid !G \mid E = E \mid E < E \mid \text{true}$ $C ::= HE.field = E \mid HE.field[E] = E \mid V = E$ $HE ::= V \mid HE.field \mid HE.field[E]$ $E ::= V \mid \text{number} \mid \text{string} \mid E.R \mid E - E \mid E + E \mid$
$\quad\quad E * E \mid E / E \mid \text{size}(SE) \mid \text{element } E \text{ of } SE$ $SE ::= S \mid V.R \mid R.V$ Figure 15   External Constraint Language

142

$hv \in HeapValue = Bit \cup Byte \cup Short \cup Integer \cup Struct$
$h \in Heap = \mathcal{P}(Object \times Field \times HeapValue) \cup Object \times Field \times \mathbb{N} \times HeapValue)$
$v \in Value = \mathbb{Z} \cup Boolean \cup string \cup Struct$
$l \in Local = Var \rightarrow Value$
$s \in Store = Value \times Value \cup Value$
$m \in Model = (\mathcal{P})(Var \times Store)$ $\mathcal{R} : \mathcal{R} \rightarrow Heap \rightarrow Local \rightarrow Model \rightarrow Boolean$
$\mathcal{E} : E \rightarrow Heap \rightarrow Local \rightarrow Model \rightarrow Value$
$\mathcal{HE} : HE \rightarrow Heap \rightarrow Local \rightarrow Model \rightarrow Object$
$\mathcal{G} : G \rightarrow Heap \rightarrow Local \rightarrow Model \rightarrow Boolean$
$\mathcal{C} : C \rightarrow Heap \rightarrow Local \rightarrow Model \rightarrow Boolean$
$\mathcal{SE} : SE \rightarrow Local \rightarrow Model \rightarrow Value$ $\mathcal{R}[\text{for } V \text{ in } S, R] h\, l\, m = \bigwedge_{n \in m(S)} \mathcal{R}[R][h/l][V \rightarrow v]m$
$\mathcal{R}[\text{for } (V_1, V_2) \text{ in } R, R] h\, l\, m = \bigwedge_{(v_1, v_2) \in m(R)}$
$\mathcal{R}[R] h\, l\, [V_1 \rightarrow v_1][V_2 \rightarrow v_2] m$
$\mathcal{R}[\text{for } V = E_1 \ldots E_2, R] h\, l\, m = \bigwedge_{n = \mathcal{E}[E_1] h\, l\, m}^{\mathcal{E}[E_2] h\, l\, m}$
$\mathcal{R}[R] h\, l\, [V \rightarrow v] m$
$\mathcal{R}[C \Rightarrow C] h\, l\, m = (\neg \mathcal{G}[G] h\, l\, m) \vee \mathcal{C}[C] h\, l\, m)$
$\mathcal{G}[G_1 \text{ and } G_2] h\, l\, m = (\mathcal{G}[G_1] h\, l\, m) \wedge (\mathcal{G}[G_2] h\, l\, m)$
$\mathcal{G}[G_1 \text{ or } G_2] h\, l\, m = (\mathcal{G}[G_1] h\, l\, m) \vee (\mathcal{G}[G_2] h\, l\, m)$
$\mathcal{G}[\neg G_1] h\, l\, m = \neg(\mathcal{G}[G_1] h\, l\, m)$
$\mathcal{G}[E_1 = E_2] h\, l\, m = (\mathcal{E}[E_1] h\, l\, m) == (\mathcal{E}[E_2] h\, l\, m)$
$\mathcal{G}[E_1 < E_2] h\, l\, m = (\mathcal{E}[E_1] h\, l\, m) < (\mathcal{E}[E_2] h\, l\, m)$
$\mathcal{G}[\text{true}] h\, l\, m = \text{true}$
$\mathcal{C}[HE.field = E] h\, l\, m = (\mathcal{HE}[HE] h\, l\, m, field, \mathcal{E}[E] h\, l\, m) \in h$
$\mathcal{C}[HE.field[E_1] = E_2] h\, l\, m =$
$(\mathcal{HE}[HE] h\, l\, m, field, \mathcal{E}[E_1] h\, l\, m, \mathcal{E}[E_2] h\, l\, m) \in h$
$\mathcal{C}[V = E] h\, l\, m = (l(V) == \mathcal{E}[E] h/l\, m)$
$\mathcal{HE}[V] h\, l\, m = l(V)$
$\mathcal{HE}[HE.field] h\, l\, m = b \text{ such that } (\mathcal{HE}[HE] h\, l\, m, field, b) \in h$
$\mathcal{HE}[HE.field[E]] h\, l\, m =$
$b \text{ such that } (\mathcal{HE}[HE] h\, l\, m, field, \mathcal{E}[E] h\, l\, m, b) \in h$
$\mathcal{E}[V] h\, l\, m = l(V)$
$\mathcal{E}[\text{number}] h\, l\, m = \text{number}$
$\mathcal{E}[V.R] h\, l\, m = b \text{ such that } (V, b) \in m(R)$
$\mathcal{E}[E_1 \oplus E_2] h\, l\, m = \text{primop}(\oplus, (\mathcal{E}[E_1] h\, l\, m), (\mathcal{E}[E_2] h\, l\, m))$
$\mathcal{E}[\text{string}] h\, l\, m = \text{string}$
$\mathcal{E}[\text{size}(SE)] h\, l\, m = |\mathcal{SE}[SE] l\, m|$
$\mathcal{E}[\text{element } E \text{ of } SE] h\, l\, m = \text{given some ordering of } \mathcal{SE}[SE] l\, m,$
pick element number $\mathcal{E}[E] h\, l\, m$
$\mathcal{SE}[S] l\, m = \{s \mid s \in m(S)\}$
$\mathcal{SE}[V.R] l\, m = \{y \mid ((V), y) \in R\}$
$\mathcal{SE}[R.V] l\, m = \{y \mid (y, l(V)) \in R\}$ FIGURE 16 Denotational Semantics for External Constraint Language

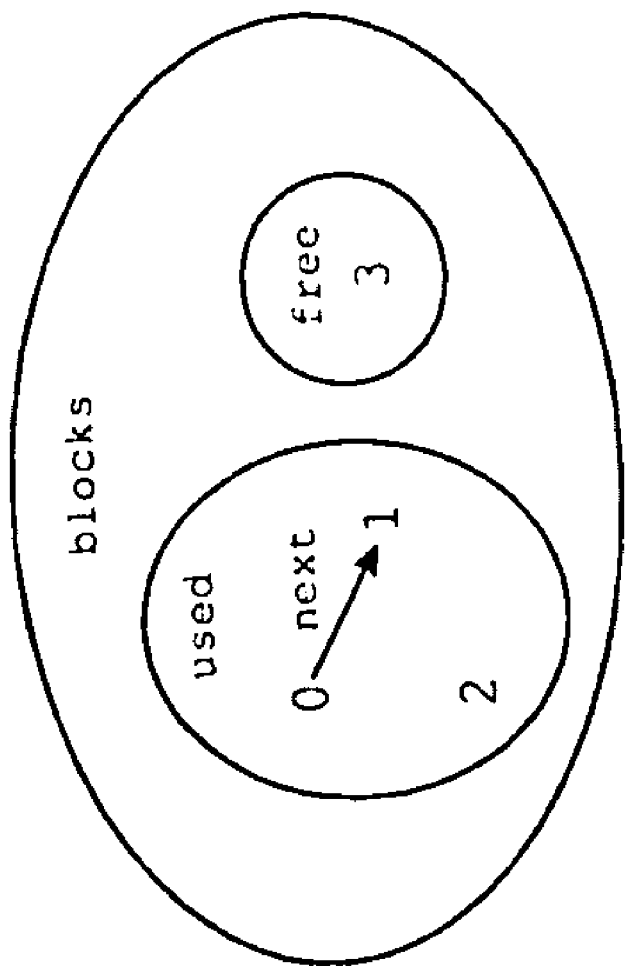
Figure 17 Repaired Model

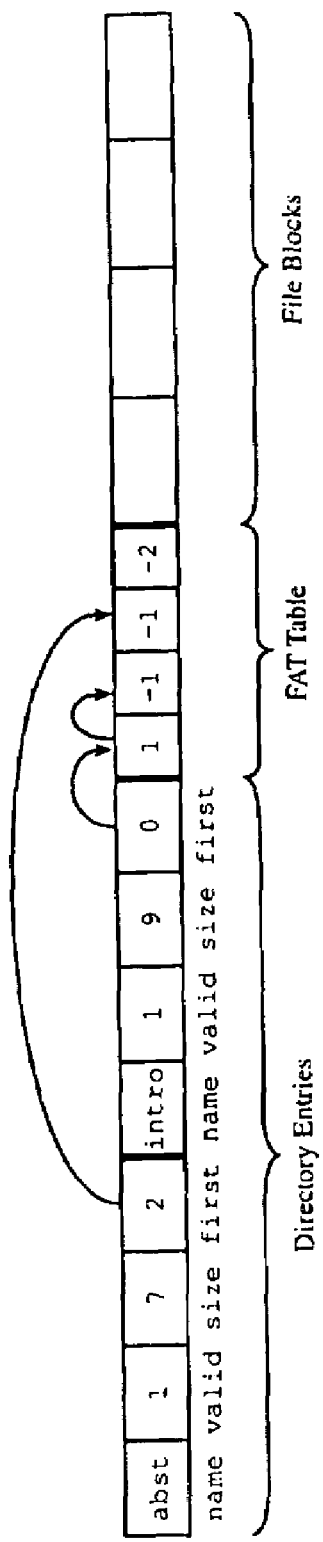
Figure 18 Repaired File System

SPECIFICATION BASED DETECTION AND REPAIR OF ERRORS IN DATA STRUCTURES

RELATED APPLICATIONS

This application claims priority to U.S. Provisional Patent Application No. 60/513,140, filed on Oct. 21, 2003, which is incorporated by reference herein.

STATEMENT OF GOVERNMENT INTEREST

The invention was made with government support under Contract Number F33615-00-C-1692, awarded by the Air Force, and Grant Number CCR-0086154, awarded by NSF. The government has certain rights in the invention.

BACKGROUND

1. Technical Field

This application generally relates to computer systems, and more particularly to a computer program that executes in a computer system.

2. Description of Related Art

Computer systems may be used in performing a variety of different tasks and operations. As known in the art, a computer system may execute instructions to perform a task or operation. A program may include instructions which are loaded into memory and executed by a processor in the computer system. The program may be produced using any one or more known techniques. These techniques include, for example, using a computer programming language with other tools, such as a compiler and linker, or interpreter, and the like. The instructions of the program, when executed, may use data stored in data structures. During execution of the program, the data structures may become inconsistent for any one or more reasons. A data structure that is "inconsistent" may be characterized as a data structure including unexpected or invalid data with respect to a known or expected state of the data structure. It may be the case that when a data structure is inconsistent, the program may not be able to continue execution productively, if at all.

Thus, it may be desirable to provide techniques in connection with detecting inconsistent data structures in accordance with a known or expected state. Upon detection of an inconsistent data structure, it may be desirable to repair the data structure such that program execution may attempt to continue. It may also be desirable to include a technique for one or more specified operations to possibly allow a program to continue execution in the event that a previous repair was unsuccessful, or otherwise insufficient, to allow the program to continue proper execution.

SUMMARY OF THE INVENTION

In accordance with one aspect of the invention is a method for detecting an inconsistent data structure comprising: receiving a specification describing at least one consistency constraint of a data structure; and dynamically determining during execution of a program whether said data structure violates said at least one consistency constraint. The specification may include at least one logical formula. The specification may include at least one consistency constraint expressed in terms of said data structure. Prior to dynamically determining whether said data structure violates said at least one consistency constraint, it may be determined whether repairing the data structure according to the at least one consistency constraint will terminate. The specification may also include a description of said data structure. The method may also include: representing said data structure as an abstract model; and determining consistency constraint violations of said abstract model. The specification may include an abstract model definition. The specification may also include at least one internal constraint in terms of said abstract model definition. The method may also include: determining if said internal constraint is violated in accordance with an evaluation of said internal constraint. The specification may include: at least one external constraint mapping elements of said abstract model to elements of said data structure. The description of said abstract model may include at least one model definition rule and at least one declaration for one of: a set and a relation, said at least one model definition rule representing an element of said data structure in at least one of a set and a relation. The specification may include at least one external constraint mapping elements of said abstract model to elements of said data structure. The dynamically determining may be performed in response to at least one of: an explicit call and a transfer of control to an error handler. Prior to dynamically determining whether said data structure violates said at least one consistency constraint, it may be determined whether construction of said abstract model will terminate. Prior to dynamically determining whether said data structure violates said at least one consistency constraint, it may determined whether said at least one model definition rule has cyclic dependencies which involve negation operators. The at least one model definition rule may be of the form: quantifier, Q, guard, G, and an inclusion constraint, I, and the method may further include: translating each guard of each of said at least one model definition rule into disjunction normal form including a logical ORing of conjunctions, each of said conjunctions including one or more predicates; constructing a graph representing said at least one model definition rule, said graph including a node for each model definition rule, a normal edge from a first rule to a second rule if the inclusion constraint for the first rule uses a set or relation which is also used in a guard of the second rule or a quantifier of the second rule, a negated edge from the first rule to the second rule if the inclusion constraint for the first rule uses a set or a relation which is negated in connection with one of a set or relation of the second rule's guard; and determining if there are any cycles in said graph with negated edges. The method may also include: prior to dynamically determining whether said data structure violates said at least one consistency constraint, it may be determined whether repairing said internal constraints will terminate. The method may also include: determining whether a memory reference in connection with said data structure is valid in accordance with the currently allocated memory of said program. The method may include: repairing said data structure if said data structure violates said at least one consistency constraint.

In accordance with another aspect of the invention is a method of dynamically repairing an inconsistent data structure during program execution comprising: receiving at least one inconsistency violation; selecting a repair to correct said at least one inconsistency violation; and repairing said inconsistent data structure. The method may also include: resuming execution of said program. The method may include: performing said repair and satisfying said consistency constraint. The inconsistent data structure may be represented in an abstract model, and the method may include: repairing said abstract model in accordance with an internal consistency constraint; and applying a repair to the inconsistent data structure in accordance with an external constraint translating said repair from said abstract model to said inconsistent data structure. The method may further include: repairing said inconsistent data structure in accordance with an internal consistency constraint. The method may also include: selecting a repair from a plurality of repairs in accordance with a cost associated with each repair. The cost may be a user specified. The inconsistency violation may include a plurality of conditions, and the method may further comprise: determining which of said plurality of conditions are true; and determining a cost for repairing said inconsistency violation in accordance with those conditions that are not true.

In accordance with another aspect of the invention is a method of handling an invalid memory reference comprising: determining whether a memory reference associated with an operation is invalid; and if said memory reference is invalid, performing a substitute action selected in accordance with said operation in place of performing said operation. The method may include: if said memory reference is associated with a read operation, supplying a default value as a result of performing said read operation; and if said memory reference is associated with a write operation, disregarding said write operation. At least one invalid read operation may have a different default value than at least one other invalid read operation. The invalid memory access may be determined during execution of said program. The determining may be performed in accordance with memory allocations associated with a program execution. The method may also include: evaluating said memory reference prior to attempting to access a portion of memory. At least one of said read operation and said write operation may use one of: a pointer access, and an array element for said memory reference. A program having an invalid memory reference may continue execution following execution of said substitute action.

In accordance with another aspect of the invention is a computer program product that detects an inconsistent data structure comprising executable code that: receives a specification describing at least one consistency constraint of a data structure; and dynamically determines during execution of a program whether said data structure violates said at least one consistency constraint. The specification may include at least one logical formula. The specification may also include at least one consistency constraint expressed in terms of said data structure. The computer program product may also include executable code that, prior to dynamically determining whether said data structure violates said at least one consistency constraint, determines whether repairing the data structure according to the at least one consistency constraint will terminate. The specification may include a description of said data structure. The computer program product may also include executable code that: represents said data structure as an abstract model; and determines consistency constraint violations of said abstract model. The specification may include an abstract model definition. The specification may include an internal constraint in terms of said abstract model definition. The computer program product may also include executable code that: determines if said internal constraint is violated in accordance with an evaluation of said internal constraint. The specification may include at least one external constraint mapping elements of said abstract model to elements of said data structure. The description of said abstract model may include at least one model definition rule and at least one declaration for one of: a set and a relation, said at least one model definition rule representing an element of said data structure in at least one of a set and a relation. The specification may include at least one external constraint mapping elements of said abstract model to elements of said data structure. The executable code that dynamically determines may be responsive to at least one of: an explicit call and a transfer of control to an error handler. The computer program product may also include executable code that, prior to dynamically determining whether said data structure violates said at least one consistency constraint, determines whether construction of said abstract model will terminate. The computer program product may also include: executable code that, prior to dynamically determining whether said data structure violates said at least one consistency constraint, determines whether said at least one model definition rule has cyclic dependencies which involve negation operators. The at least one model definition rule may be of the form: quantifier, Q, guard, G, and an inclusion constraint, I, and the computer program product may also include executable code that: translates each guard of each of said at least one model definition rule into disjunction normal form including a logical ORing of conjunctions, each of said conjunctions including one or more predicates; constructs a graph representing said at least one model definition rule, said graph including a node for each model definition rule, a normal edge from a first rule to a second rule if the inclusion constraint for the first rule uses a set or relation which is also used in a guard of the second rule or a quantifier of the second rule, a negated edge from the first rule to the second rule if the inclusion constraint for the first rule uses a set or a relation which is negated in connection with one of a set or relation of the second rule's guard; and determines if there are any cycles in said graph with negated edges. The computer program product may also include: executable code that, prior to dynamically determining whether said data structure violates said at least one consistency constraint, determines whether repairing said internal constraints will terminate. The computer program product may also include executable code that: determines whether a memory reference in connection with said data structure is valid in accordance with currently allocated memory of said program. The computer program product may further comprise executable code that: repairs said data structure if said data structure violates said at least one consistency constraint.

In accordance with another aspect of the invention is a computer program product that dynamically repairs an inconsistent data structure during program execution comprising executable code that: receives at least one inconsistency violation; selects a repair to correct said at least one inconsistency violation; and repairs said inconsistent data structure. The computer program product may include: executable code that resumes execution of said program. The computer program product may further comprise executable code that performs said repair and satisfies said at least one consistency constraint. The inconsistent data structure may be represented in an abstract model, and the computer program product comprising executable code that: repairs said abstract model in accordance with an internal consistency constraint; and applies a repair to the inconsistent data structure in accordance with an external constraint translating said repair from said abstract model to said inconsistent data structure. The computer program product may further comprise executable code that: repairs said inconsistent data structure in accordance with an internal consistency constraint. The computer program product may include executable code that: selects a repair from a plurality of repairs in accordance with a cost associated with each repair. The cost may be user specified. The inconsistency violation may include a plurality of conditions, and the computer program product may further include executable code that: determines which of said plurality of conditions are true; and determines a cost for repairing said inconsistency violation in accordance with those conditions that are not true.

In accordance with another aspect of the invention is a computer program product that handles an invalid memory reference comprising executable code that: determines whether a memory reference associated with an operation is invalid; and if said memory reference is invalid, performs a substitute action selected in accordance with said operation in place of performing said operation. The computer program product may also include executable code that: if said memory reference is associated with a read operation, supplies a default value as a result of performing said read operation; and if said memory reference is associated with a write operation, disregards said write operation. At least one invalid read operation may have a different default value than at least one other invalid read operation. The invalid memory access may be determined during execution of said program. The executable code that determines may be performed in accordance with memory allocations associated with a program execution. The computer program product may further comprise executable code that: evaluates said memory reference prior to attempting to access a portion of memory. At least one of said read operation and said write operation may use one of: a pointer access, and an array element for said memory reference. A program having an invalid memory reference may continue execution following execution of said substitute action.

BRIEF DESCRIPTION OF THE DRAWINGS

Features and advantages of the present invention will become more apparent from the following detailed description of exemplary embodiments thereof taken in conjunction with the accompanying drawings in which:

FIG. 6 is an example of an embodiment of a grammar that may be used for specifying a data structure layout;

FIG. 7 is an example of a data structure layout using the grammar of FIG. 6;

FIG. 8A is an example of a general form of sets and relation declaration that may be used in an embodiment;

FIG. 8B is an example of a set and relation declaration using the form of FIG. 8A;

FIG. 9 is an example of a graphical representation of the declarations of FIG. 8B;

FIG. 10 is an example of a representation of a grammar for a model definition language;

FIG. 11 is an example of denotational semantics for the language of FIG. 10;

FIG. 12A is an example of model definition rules of an abstract model in accordance with FIGS. 10 and 11;

FIG. 12B is an example of a representation of an inconsistent model that is an abstract model of the data structure of FIG. 5;

FIG. 13 is an example of an embodiment of a grammar of an internal constraint language;

FIG. 14 is an example of denotational semantics for the language of FIG. 13;

FIG. 15 is an example of an embodiment of a grammar for an external constraint language;

FIG. 16 is an example of denotational semantics for the language of FIG. 15;

FIG. 17 is an example representation of a repaired model;

FIG. 18 is an example of a repaired data structure;

DETAILED DESCRIPTION OF EMBODIMENT(S)

Figure 1:
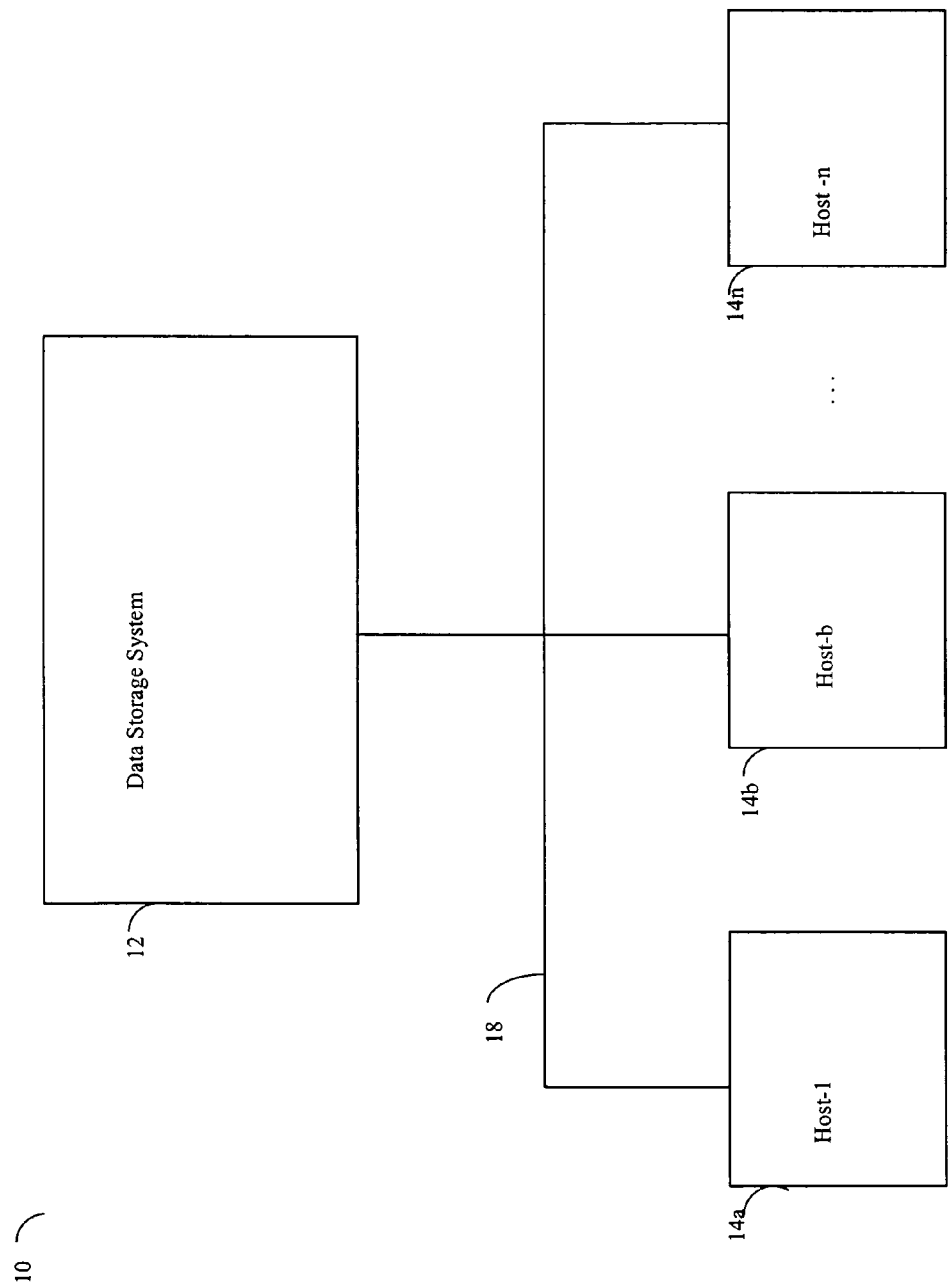
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a-14n through communication medium 18. In this embodiment of the computer system 10, the N hosts 14a-14n may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire, wireless, or other connection known in the art. For example, the communication medium 18 may be the Internet, an intranet, network or other connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. It should be noted that the particulars of the hardware and software included in each of the host systems 14a-14n, as well as those components that may be included in the data storage system 12, are described herein in more detail, and may vary with each particular embodiment. Each of the host computers 14a-14n may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, Fibre Channel, or GIGE (Gigabit Ethernet), and the like. Some or all of the connections by which the hosts and data storage system 12 may be connected to the communication medium 18 may pass through other communication devices, such as switching equipment including, without limitation, a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation, such as a read or a write operation.

Figure 2:
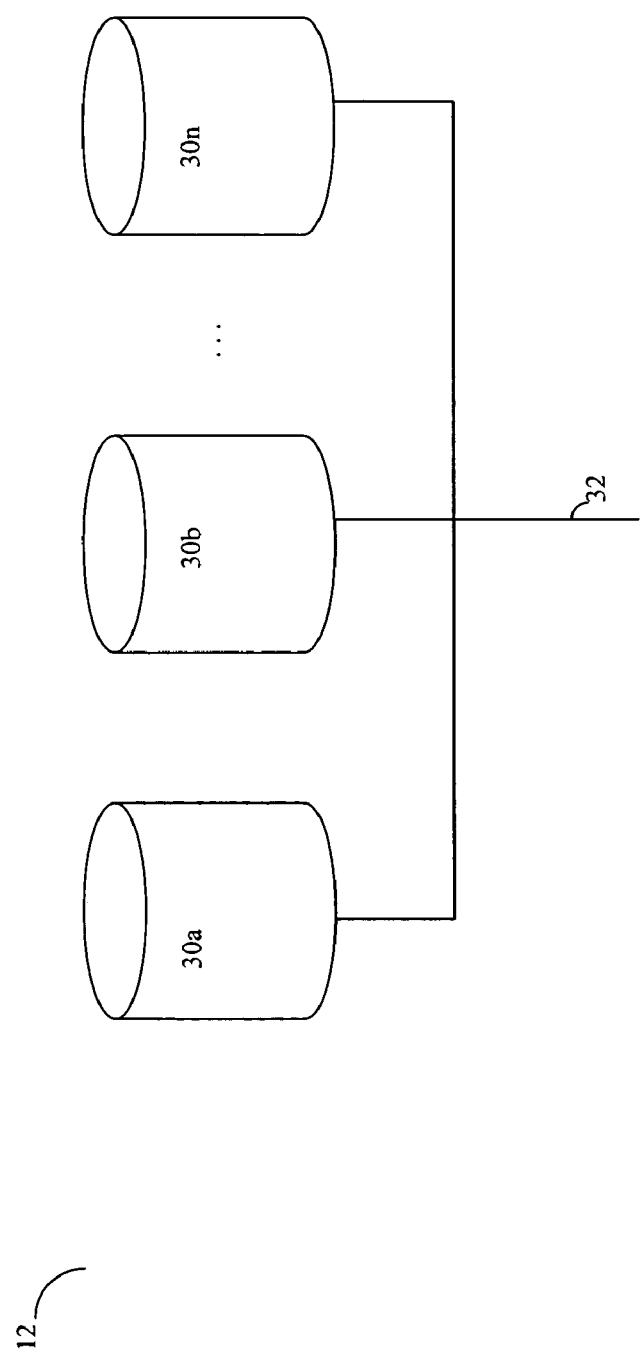
FIG. 2 is an example of an embodiment of a data storage system of the computer system of FIG. 1.

Referring now to FIG. 2, shown is an example of an embodiment of a data storage system 12 that may be included in the computer system 10 of FIG. 1. The data storage system 12 in this example may include a plurality of data storage devices 30a through 30n. The data storage devices 30a through 30n may communicate with components external to the data storage system 12 using communication medium 32. Each of the data storage devices may be accessible to the hosts 14a through 14n using an interface connection between the communication medium 18 previously described in connection with the computer system 10 and the communication medium 32. It should be noted that a communication medium 32 may be any one of a variety of different types of connections and interfaces used to facilitate communication between communication medium 18 and each of the data storage devices 30a through 30n.

The data storage system 12 may include any number and type of data storage devices. For example, the data storage system may include a single device, such as a disk drive, as well as a plurality of devices in a more complex configuration, such as with a storage area network and the like. Data may be stored, for example, on magnetic, optical, or silicon-based media. The particular arrangement and configuration of a data storage system may vary in accordance with the parameters and requirements associated with each embodiment.

Each of the data storage devices 30a through 30n may be characterized as a resource included in an embodiment of the computer system 10 to provide storage services for the host computer systems 14a through 14n. The devices 30a through 30n may be accessed using any one of a variety of different techniques. In one embodiment, the host systems may access the data storage devices 30a through 30n using logical device names or logical volumes. The logical volumes may or may not correspond to the actual data storage devices. For example, one or more logical volumes may reside on a single physical data storage device such as 30a. Data in a single data storage device may be accessed by one or more hosts allowing the hosts to share data residing therein.

Figure 3:
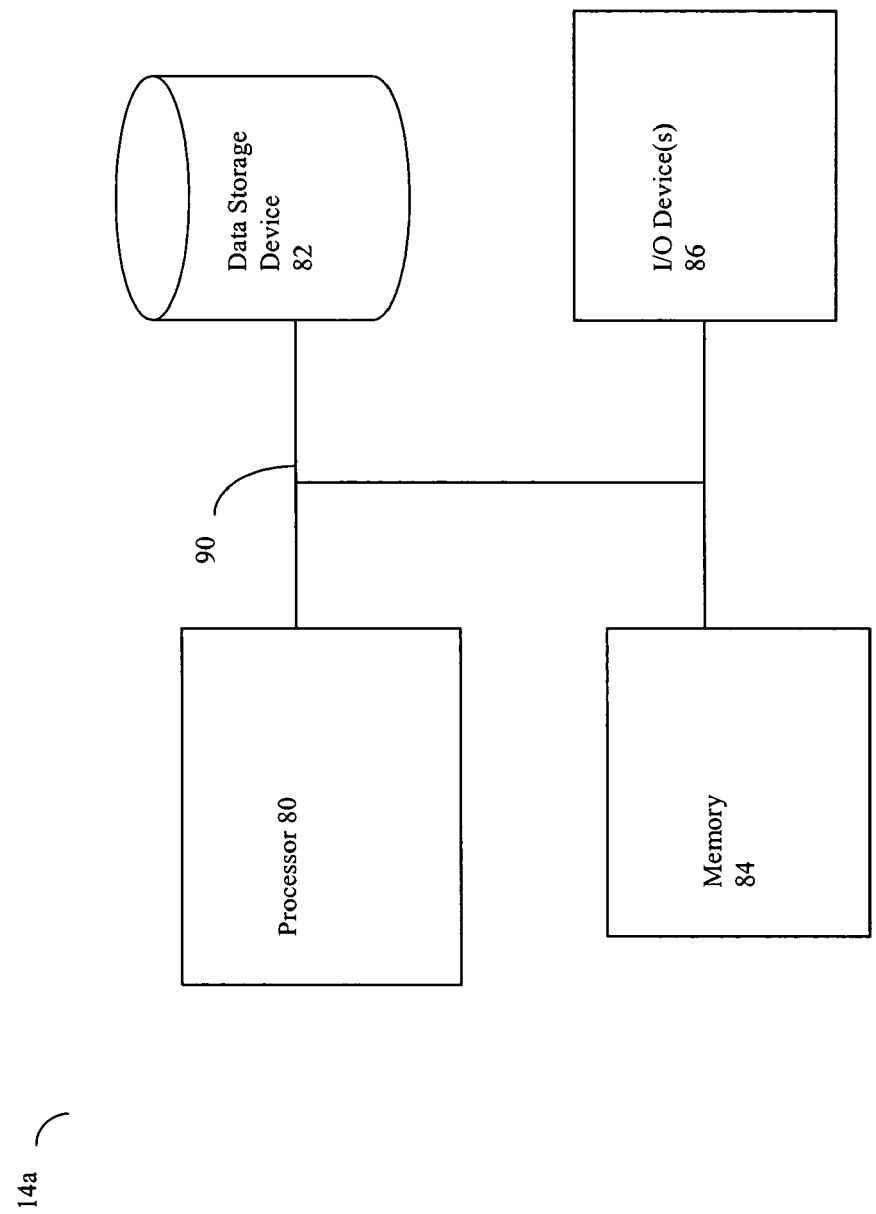
FIG. 3 is an example of an embodiment of components that may be included in a host system of the computer system of FIG. 1.

Referring now to FIG. 3, shown is an example of an embodiment of a host or user system 14a. It should be noted that although a particular configuration of a host system is described herein, other host systems 14b-14n may also be similarly configured. Additionally, it should be noted that each host system 14a-14n may have any one of a variety of different configurations including different hardware and/or software components. Included in this embodiment of the host system 14a is a processor 80, a memory, 84, one or more I/O devices 86 and one or more data storage devices 82 that may be accessed locally within the particular host system. Each of the foregoing may communicate using a bus or other communication medium 90. Each of the foregoing components may be any one or more of a variety of different types in accordance with the particular host system 14a.

Each of the processors included in the host computer systems 14a-14n may be any one of a variety of commercially available single or multi-processor system, such as an Intel-compatible x86 processor, an IBM mainframe or other type of commercially available or proprietary processor, able to support incoming traffic in accordance with each particular embodiment and application.

Instructions may be executed by the processor 80 to perform a variety of different operations. As known in the art, executable code may be produced, for example, using a linker, a language processor, and other tools that may vary in accordance with each embodiment. Instructions and data may also be stored on a data storage device 82, ROM, or other form of media or storage. The instructions may be loaded into memory 84 and executed by processor 80 to perform a particular task.

In one embodiment, an operating system, such as the Windows operating system by Microsoft Corporation, may reside and be executed on one or more of the host computer systems included in the computer system 10 of FIG. 1.

Programs may execute on a processor, such as may be included in one of the host systems described herein. The program may operate on data structures during this execution. At some point during execution of the program, a programming error or some other anomaly may cause a data structure to become inconsistent such that the basic assumptions under which the program was developed no longer hold. In this instance, the program may behave in an unpredictable manner and may even fail to further execute at all. In an attempt to deal with the inconsistent data structure, techniques are described in following paragraphs such that the data structure inconsistencies may be detected in accordance with specified consistency constraints. Additionally, also described herein are techniques which may be used for automatic repair of data structures violating specified constraints. It should be noted that the techniques described in following paragraphs may not necessarily restore the data structure to the state in which a correct program would have left them. However, the techniques may restore the data structure to a state in accordance with basic consistency assumptions such that the program, for example, may be allowed to continue execution with data structures restored or repaired in accordance with specified consistency constraints.

Figure 4:
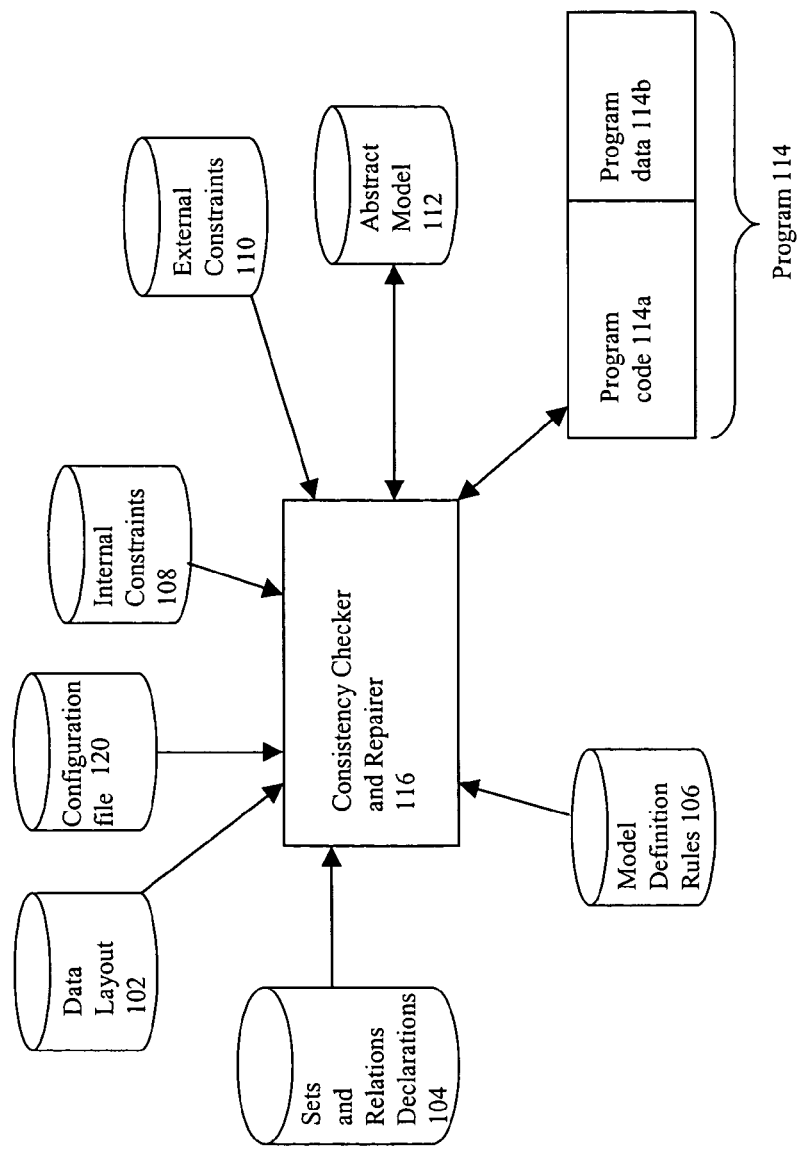
FIG. 4 is an example of an embodiment of components that may be included in a host computer of FIG. 1.

Referring now to FIG. 4, shown is an example 100 of an embodiment of components that may be included in one of the host systems in the computer system 10 of FIG. 1. A program 114 may be executing within one of the host computer systems. The program 114 in this example includes program code 114a and program data 114b. The program code 114a may include instructions executed by a processor that operate on the data in the program data section 114b. The data structures described in following paragraphs may be included within the program data portion 114b.

It should be noted that the use of the term specification in connection with the system and techniques described herein may be characterized as the information used in determining whether one or more particular data structures are consistent or not. In one embodiment, as described in more detail in following paragraphs, the specification may include the contents of various input files that are described in the representation 100 of FIG. 4.

In an embodiment, a specification may identify multiple properties that the data structure satisfies to be consistent. A property may be identified using a consistency constraint which may be expressed as a logical formula in some logic.

The representation 100 includes a program 114 and a consistency checker and repairer 116. As will be described in following paragraphs, the consistency checker and repairer 116 may be used in the detection and/or repair of data structures used by the program 114. The consistency checker and repairer 116 uses the data layout 102, the sets and relations declarations 104, the model definition rules 106, the internal constraints 108, and the external constraints 110. As part of performing the consistency check and/or repair, the consistency checker and repairer 116 constructs an abstract model 112. Each of the elements 102, 104, 106, 108, and 110 are provided as inputs to the consistency checker and repairer 116.

The data layout 102 may be characterized as representing the concrete data structures of the program data section 114b and used during execution of the program 114. The data layout 102 may be specified using a structure definition language to declare the layout of the particular data structures as they appear in memory during execution of the program 114. The sets and relation declarations 104 and the model definition rules 106 may be used in the declaration and specification of an abstract model. The sets and relation declarations 104 include declarations of sets and relations in the abstract model. The model definition rules 106 define a translation from the concrete data structures, as may be expressed with the data layout 102, into an abstract model. The consistency checker and repairer 116 uses the data layout 102 to represent an instance of a data structure included in the program data section 114b in an abstract representation in accordance with the abstract model as specified in elements 104 and 106. Once the data structure is represented in an abstract model form 112, the consistency checker and repairer 116 uses internal constraints 108 to perform a consistency check on the abstract model 112. As described in following paragraphs, the consistency checker and repairer 116 detects and determines which internal consistencies as specified in accordance with the internal constraints 108 are violated by a data structure. If one or more of the internal constraints 108 are determined as being violated, the consistency checker and repairer may attempt to repair the data structure by removing an internal inconsistency or an internal constraint violation. If the data structure may be repaired, a particular repair is selected and performed by the consistency checker and repairer 116. Accordingly, the abstract model may be updated by the repair portion of the consistency checker and repairer 116 such that all internal constraints specified in 108 are satisfied. Subsequently, the data structures within the program data section 114b may be updated to satisfy the external constraints 110. The external constraints 110 specify a translation of the updated or revised abstract model back to the concrete or actual representation of the data structure included in the program data section 114b.

The techniques described herein utilize two data structure views that may be characterized as a concrete view and an abstract view. A concrete view of the data structure may be characterized as a view of the data structure as it appears in memory with respect to the particular program being executed. The abstract view represents an abstraction of the concrete data structure at the level of relations between abstract objects. The abstract view may be used to facilitate both the specification of higher level data structure constraints and the reasoning required to repair any detected inconsistency. Using the techniques described herein, an embodiment may automatically detect and repair data structures in accordance with predetermined constraints.

It should be noted that each of the foregoing components of the representation 100 are described in more detail in connection with the particular steps performed by the consistency checker and repairer 116.

It should also be noted that as described herein, the consistency checker and repairer 116 may include functionality for performing both the processing steps associated with determining whether a data structure is inconsistent as well as possibly repair an inconsistent data structure. It should be noted that repairing the data structure may be an optional step performed within an embodiment using the techniques described herein.

A configuration file 120 may also be included in an embodiment of the components 100. As described in following paragraphs, the configuration file 120 may be used to specify user options, for example, that may override standard options included in an embodiment. These particular uses that may be included in an embodiment are described elsewhere herein in more detail, for example, in connection with performing data structure repairs.

With reference to the components of 100 of FIG. 4, elements 102, 104, 106, 108, 110, and 120 are inputs to the consistency checker and repairer 116. Additionally, a data structure used by the program 114 (from the program data portion 114b) is also an input to the consistency checker and repairer 116. The abstract model 112 may be built by the consistency checker and repairer 116, as described elsewhere herein, in connection with determining internal constraint violations and/or repairing a data structure.

The consistency checker and repairer may operate in accordance with any one or more different approaches. One embodiment may include the consistency checker and repairer operating as part of an interpretive system. An embodiment of the techniques described herein may operate in accordance with other approaches besides that of the interpretive system. It should be noted that the particular examples set forth in following paragraphs should not be construed as a limitation of the techniques described herein.

What will now be described is a particular example using a file system. In connection with performing a consistency check and repair of the particular data structure associated with the file system, examples of some of the input files shown in the illustration 100 of FIG. 4 as may be used in one embodiment will also be described and shown in more detail.

Figure 5:
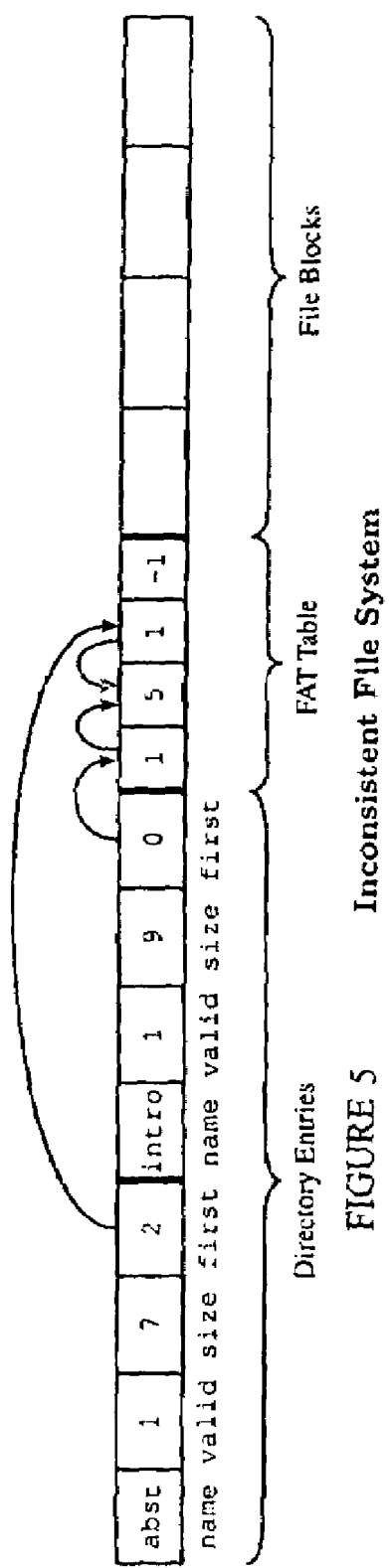
FIG. 5 is an example of a representation of an inconsistent data structure.

Referring now to FIG. 5, shown is an example 120 of a representation of a file system and an associated data structure representing that particular file system. The data structure 120 includes 3 parts: a directory, a file allocation table (FAT), and an array of file blocks. Each file includes a linked chain of file blocks. The FAT is a fixed-size array of block indices implementing a linking structure. Specifically, if a block j is in the chain of blocks for a given file, then FAT [j] is the index of the next block in the chain. The FAT may also contain a special value. In one embodiment, if FAT [j]=−1, then block j is the last block in the chain. If FAT [j]=−2, then block j is not in any chain and is free for allocation. The directory in this example includes a fixed number of entries. Each entry contains a file name, a flag indicating whether the entry is valid or not, a field indicating the size of the file, and the index of the first block in the file's chain of blocks. The representation 120 graphically represents an instance of a data structure of an inconsistent file system with two directory entries and four file blocks. In this example, the file system has two file names, abstr and intro. Abst is size 7 and starts at file block 2. Intro has the size of 9 and starts at file block 0.

To illustrate the techniques described herein, though a full range of constraints may be used in connection with a file system, this particular example will focus on constraints of chain disjointness and free block consistency. Chain disjointness is a constraint specifying that each file block should be in at most one chain. The free block consistency constraint specifies that no chain should contain a file block marked as free in the FAT. It should be noted that these constraints may be stated in terms of conceptual entities such as chains of file blocks in an abstract model rather than directly in terms of particular bits of the concrete data structure. To support such an expression of these kinds of constraints at an appropriate level of abstraction, a translation may be made from a concrete data structure, as may be stored in memory at run time into, to an abstract model 112 based on relationships between abstract objects. This abstract model 112 may then be used to express the desired consistency constraint.

What will now be described are examples of input files previously described in connection with illustration 100 of FIG. 4 and to the example 120 of FIG. 5.

The data layout file 102 may include a description of a concrete data structure representation or a declaration of the data structure memory layout as may be used during execution of the program 114 when the consistency checker and repairer is invoked to repair an instance of a particular data structure, such as the data structure shown in element 120 of FIG. 5.

Referring now to FIG. 6, shown is an example of a representation 122 of a grammar that may be used in an embodiment to represent the data layout 102. It should be noted that the particular examples, such as the example grammar shown in element 122 of FIG. 6, are shown only for the purpose of illustration of the techniques described herein. An embodiment may use other representations than as shown herein.

The grammar of 122 may be used in connection with declaring fields of a structure in a C-style notation. These fields in the structure may be, for example, 8, 16 and 32 bit integers; structures; pointers to structures; arrays of integers, packed booleans, structures, and pointers to structures. In this example grammar, array bounds may be either constants or expressions over particular program variables. Additionally, a region of memory within a structure may be specified as "reserved" indicating that the region is unused. The structure definition language represented by the grammar 122 supports a form of structure inheritance. A substructure has the same size and contains all of the same fields as a superstructure including the substructure. The substructure may also define new fields in areas that are unused within the superstructure.

It should be noted that although the representation 122 of FIG. 6 provides a structure definition language that may be similar to the C programming language, the foregoing grammar included in 122 supports a wider range of primitive data types than the C programming language and also provides a form of structure inheritance and allows for definition of inline variable length arrays.

Referring now to FIG. 7, shown is a representation 124 of structure declarations that may be included in the data layout 102 to represent the particular instance of the data structure 120. The example representation 124 uses the grammar 122 of FIG. 6. Within the element 124, the Entry declaration identifies the format of each directory entry previously shown in the illustration 120. The name field contains the name of the file. The valid field indicates whether the directory entry corresponds to a valid file or not. The size field indicates the size of the file. The first field is the index of the first disk block and the index of that first FAT table entry for the file. The disk declaration identifies the disk as an array of directory entries followed by the FAT array and then the file block. In the example of 124, NumEntries, NumBlocks, Length, and Blocksize are all constants although other declarations may be used in which such quantities may be stored in data structure fields.

In connection with specifying an abstract model, the sets and relations declarations 104 and model definition rules 106 previously described in connection with the illustration 100 of FIG. 4 may be used.

Referring now to FIG. 8A, shown is a generalized form of declarations that may be used in an embodiment to declare sets and relations for an abstract model. The representation 125 specifies a set declaration of the form "set S of T", as indicated by the first line of 125. A set S may be declared containing objects of the type T where T is either a primitive type or a struct type declared in the structure definition part of the specification. It should be noted that in the event that the type is a primitive type, for example such as an integer, a range may optionally be constrained to be between two particular values in connection with defining the set. The set S in this example has n subsets, $S_1$ through $S_n$, which together partition the set S. Changing the "partition" keyword to "subset" may also be used in an embodiment to remove the requirement that the subset partition S, but otherwise leaves the declaration meaning unchanged. A relation declaration may be of the form as included in the second line of 125 declaring a relation R between objects in the sets $S_1$ and $S_2$.

Referring now to FIG. 8B, shown is an example of a representation 126 of object and relation declarations that may be used in connection with the file system 120 of FIG. 5. The example 126 uses the general form of 125 of FIG. 8A. The representation 126 of the object and relation declarations of the file system includes three sets of objects: "blocks", "used", and "free". Together, "used" and "free" partition the set of "block" indices which, in turn, is a subset of the set of integer objects. The "next" relation models chains of "used" file blocks.

Referring now to FIG. 9, shown is a graphical representation of the object and relation declarations for the example shown in 126 of FIG. 8B. Element 129a represents the set of "blocks". Element 129b represents the set of "free" blocks. Element 129c represents the set of "used" blocks. The line with the arrowhead of 129e connects "used" blocks 129c and "free" blocks 129b with the more general category or set of "blocks" 129a. In other words, 129e indicates that, together, 129b and 129c partition the set 129a. The edge 129d represents the "next" relation on the "used" blocks. Object modeling formulas are well known for declarations as just described, for example, in D. Jackson, Alloy: A lightweight object modelling notation, Technical Report 797, Laboratory for Computer Science, Massachusetts Institute of Technology, 2000, and the Unified Modeling Language by Rational, Inc., http://ww.rational.com/uml.

The particular declarations in the example 126 may be included within the sets and relations declarations file 104 for use in connection with the example data structure 120 of FIG. 5.

What will now be described is one representation of a model definition language that may be used in an embodiment in connection with defining a translation from the concrete data structure as represented in the data layout 102 into an abstract model.

Referring now to FIG. 10, shown is a representation 130 of the grammar that may be used in connection with defining a model definition language. Each rule produced using the grammar 130 has a quantifier, Q, that identifies the scope of the rule, C, a guard, G, whose predicate is true for the rule to apply, and an inclusion constraint, I, specifying either that an object is in a given set, or that a tuple is in a given relation.

Referring now to FIG. 11, shown are the denotational semantics for a single rule C that may be used in an embodiment in connection with the foregoing grammar 130 of FIG. 10 to represent and interpret the model definition rules. FIG. 11 element 132 gives the denotational semantics $\Re[C]$ h l m of a single rule C. A model m is a mapping from set names and relation names to the corresponding sets of objects or relations between objects where m(s) may be defined as the set $\{<v,s>|<v,s> \in m\}$. This mapping may be represented using a set of tuples. The set h models the heap in the running program using a set of tuples representing the references in the heap. The set h models the heap in the running program 114 using a set of tuples representing references in the heap. The set h contains tuples that represent a mapping of each proper or valid pairing of object and field; or object, field, and integer index to exactly one Heap Value. It should be noted as used herein, the term heap does not refer to a particular heap data structure but rather represents a portion of memory from which storage is allocated as needed during runtime. Given a set of concrete data structures, h, a naming environment, l, that maps variables to data structures or values, and a current model, m, $\Re[C]$ h l m is the new model after applying the rule to m in the context of h and l. Note that l provides the values of both the program variables that the rules use to reference the concrete data structure and the variables bound in the quantifiers.

The model definition rules 106 include a set of rules $C_1, \ldots, C_n$ as defined above. An embodiment may use fixed point computation processing to produce the abstract model. This is described elsewhere herein in more detail. Fixed point computation is well known as described, for example, in "Principles of Program Analysis", by Flemming Nielson, Hanne Riis Nielson and Chris Hankin. Given a model containing these rules, a set of concrete data structures h, and a naming environment l for the program variables, the abstract model may be determined in an embodiment as the least fixed point of the functional $\lambda m$ ($\Re$ $[C_i]$ h l m)...($\Re$ $[C_n]$ h l m). It should be noted that the presence of negation in the model definition language used in this embodiment presents a complication of the fixed point computation processing in construction of the abstract model. For example, negation makes it possible for a rule to specify that an object is in a given set only if another object is not in a set. This complication is addressed using processing steps described elsewhere herein by requiring the set of model definition rules to have no cycles that go through rules with negated inclusion constraints in their guards.

Referring now to FIG. 12A, shown is the representation 134 of model definition rules as may be specified in an embodiment in accordance with the data structure 120 of FIG. 5. The representation 134 uses the grammar of the model definition language 130 of FIG. 10 and the semantics of 132 of FIG. 11.

It should be noted in connection with the rules of 134 of FIG. 12A, the variable "Disk" may be used to refer to a disk image. For data structures that may be characterized as long lived contained in disk images or files, variables may be offsets within the disk image or file. These offsets may be defined in a configuration file that is not included here for the sake of simplicity and brevity. For in-memory data structures, the model definition rules use the program variables to refer to the concrete data structures as may be used by the program 114 at run time. The rules 134 of FIG. 12A in this example start from the directory entries and use the FAT Table to trace out the "next" relation and compute the sets of both "used" and "free" blocks.

Referring now to FIG. 12B, shown is a graphical representation 144 of an example of an abstract model of the data structure 120 of FIG. 5. Applying the model rules of 134 of FIG. 12A to the example file system 120 of FIG. 5, the model 144 of FIG. 12B may be obtained. The model representation 144 has the following sets and relations: "used"={0, 1, 2}, "free"={3}, and "next"={<0,1>, <2,1>}. The representation 144 FIG. 12B uses a Venn diagram to present the assignment of objects, which in this case are 0, 1, 2 and 3, to sets. The representation uses arrows to represent the "next" relation.

The representation 144 may be produced using techniques described in following paragraphs by the consistency checker and repairer 116. Subsequently, in accordance with internal constraints defined elsewhere herein, the foregoing abstract model representation 144 of FIG. 12B may be determined to be inconsistent by the consistency checker and repairer 116. What will now be described are the internal constraints that may be used in an embodiment.

Referring now to FIG. 13, shown is a representation 136 of a grammar that may be used in specifying the internal constraints that may be included in the input file 108 of FIG. 4. Each internal constraint consists of a sequence of Quantifiers $Q_1, \ldots Q_n$ followed by a body B. The body uses logical connectives, such as AND, OR, and NOT, to combined basic propositions P. The internal constraints in this embodiment may be specified using the abstract model terms exclusively and not in terms of concrete data structures.

Referring now to FIG. 14, shown is a representation 138 of the denotational semantics for the internal constraint language previously described in connection with 136 of FIG. 13. Given an internal constraint C and a model m, $\epsilon$ v[C]θ m is true if the internal constraint is satisfied in m, and false otherwise. One complexity expressed in the semantics relates to the arithmetic and logical expression involving relations. Consider, for example, an expression of the form $V_1 \cdot R_1 + V_2 \cdot R_2$ where $V_1 \cdot R_1$ may be characterized as the set of objects in the image of $V_1$ under $R_1$ rather than a single value. In one embodiment, the expressions may be used only when the relational image contains a single value. The primitive arithmetic and logical operations used in an embodiment may be designed to take as inputs two singleton sets and produce an appropriate singleton set as an output. When given a non-singleton set as an input, the primitives in an embodiment may produce the undefined value and extend the arithmetic operators to work with the undefined values, and the logical operations to use three-valued logic involving maybe. In other words, an embodiment may optionally utilize maybe three-valued logic as an alternative to generating an error when a value is undefined. The truth tables for maybe that may be used in an embodiment are represented as follows:

TRUE OR MAYBE=TRUE
FALSE AND MAYBE=FALSE
FALSE OR MAYBE=MAYBE
TRUE AND MAYBE=MAYBE
MAYBE OR MAYBE=MAYBE
MAYBE AND MAYBE=MAYBE

Other truth values are as well-known for standard binary logic.

It should be noted that an embodiment may also include a modified version of the grammar used for the internal constraint language which provides for the expression of ownership properties. However, expressing these properties in an embodiment may also require the construction of auxiliary relations during the model construction phase. Additionally, the termination check processing described elsewhere herein to insure that repair processing terminates may need to be modified since this check currently rules out ownership properties. It should be noted that other embodiments may use other properties and relations in as described herein.

With reference to the example 120 of the file system of FIG. 5, an embodiment may specify a single internal consistency constraint as:

for b in used, size(next.b)<=1 which states that each used block participates in at most one incoming next relation. The foregoing internal consistency constraint may be stored in the internal constraints file 108 of FIG. 4 described elsewhere herein. Note that the foregoing uses the notation "next.b" to indicate "b" under the inverse of the next relation; i.e., the set of all i such that <i,b> is in next.

Referring back to the abstract model 144 FIG. 12B, the data structure is inconsistent with respect to the foregoing internal consistency constraint. Recall, as described elsewhere herein, the internal constraints are specified in terms of the abstract model representation exclusively in this embodiment. In the abstract model representation 144, file block 1 145*a* is in two chains such that both <0,1> and <2,1> are in the next relation. This inconsistency violates the internal consistency constraint that "size(next.1)<=1".

An embodiment of the consistency checker and repairer 116 may repair the foregoing abstract model representation by removing one of the tuples in the next relation shown in 144 of FIG. 12B.

Referring now to FIG. 17, shown is a representation 146 of a repaired abstract model. In this example, the repair processing, described elsewhere herein in more detail, has removed <2,1> from the next relation. Once repair processing has been performed on the abstract model, the repairs may then be applied to the concrete data structure. One embodiment uses external consistency constraints to translate the corrected abstract model to the concrete data structure. In other words, the external consistency constraints may be used to apply the repairs to the data structure instance used at runtime.

What will now be described are the external consistency constraints and how they may be specified in an embodiment.

Referring now to FIG. 15, shown is a representation 140 of a grammar that may be used in connection with specifying external constraints 110 previously described in the illustration 100 of FIG. 4. The representation 140 specifies that each external constraint in this embodiment has a quantifier, Q, identifying the scope of the guard, G, that is true for the external constraint to apply. A condition, C, specifies either a program variable, a field in a structure, or an array element having a given value.

Referring now to FIG. 16, shown is a representation 142 of the denotational semantics for the external constraint language previously described in connection with element 140 of FIG. 15. Given an external constraint R, a heap h, a naming environment l, and a model m, ℜ[R] h l m is true if the external constraint is satisfied for h, l, and m.

Shown below are the external consistency constraints that may be specified in an embodiment for the file system example of FIG. 5, such as in the external constraints file 110 of FIG. 4.

for b in free, disk.FAT[b]=−2;
for <i,j> in next, disk.FAT[i]=j;
for b in used, size(b.next)=0−>disk.FAT[b]=−1;

The external consistency constraints may reference both the concrete data structure and the abstract model. The external consistency constraints capture the requirements that the sets and relations in the abstract model place on the value in the concrete data structures. The techniques described herein use the external consistency constraints to translate the repairs made to the abstract model, as illustrated in 146 of FIG. 17, into repairs to the concrete data structure used by the executing program 114. It should be noted that the external consistency constraints may also include what may be characterized as basic representation constraints such as, for example, the requirement that FAT entries either be −1, −2 or contain a valid file block index. Repairs that enforce these may therefore be used to modify corrupted values in the data structures in addition to the third external consistency constraint regarding the next elements.

Referring now to FIG. 18, shown is a representation 148 of a repaired file system from FIG. 5 in accordance with the particular consistency constraints specified for this example focusing on the linking structure implemented in the FAT table. In applying the repairs, the sharing of file block 1 is eliminated and the abst file is truncated at disk block 2. The repair shows in the file system as a change in the FAT entry for block 2 from 1 to −1. The repair technique corrects corrupted values in the FAT table, such as change the FAT entry for block 1 from 5 to −1 (indicating that block 1 is the last block in its file block chain) and change the FAT entry for block 3 from −1 to −2 (indicating that block 3 is free).

What will now be described is an interpretive system illustrating consistency and repair techniques. However, as described elsewhere herein, an embodiment may use other approaches.

Figure 19:
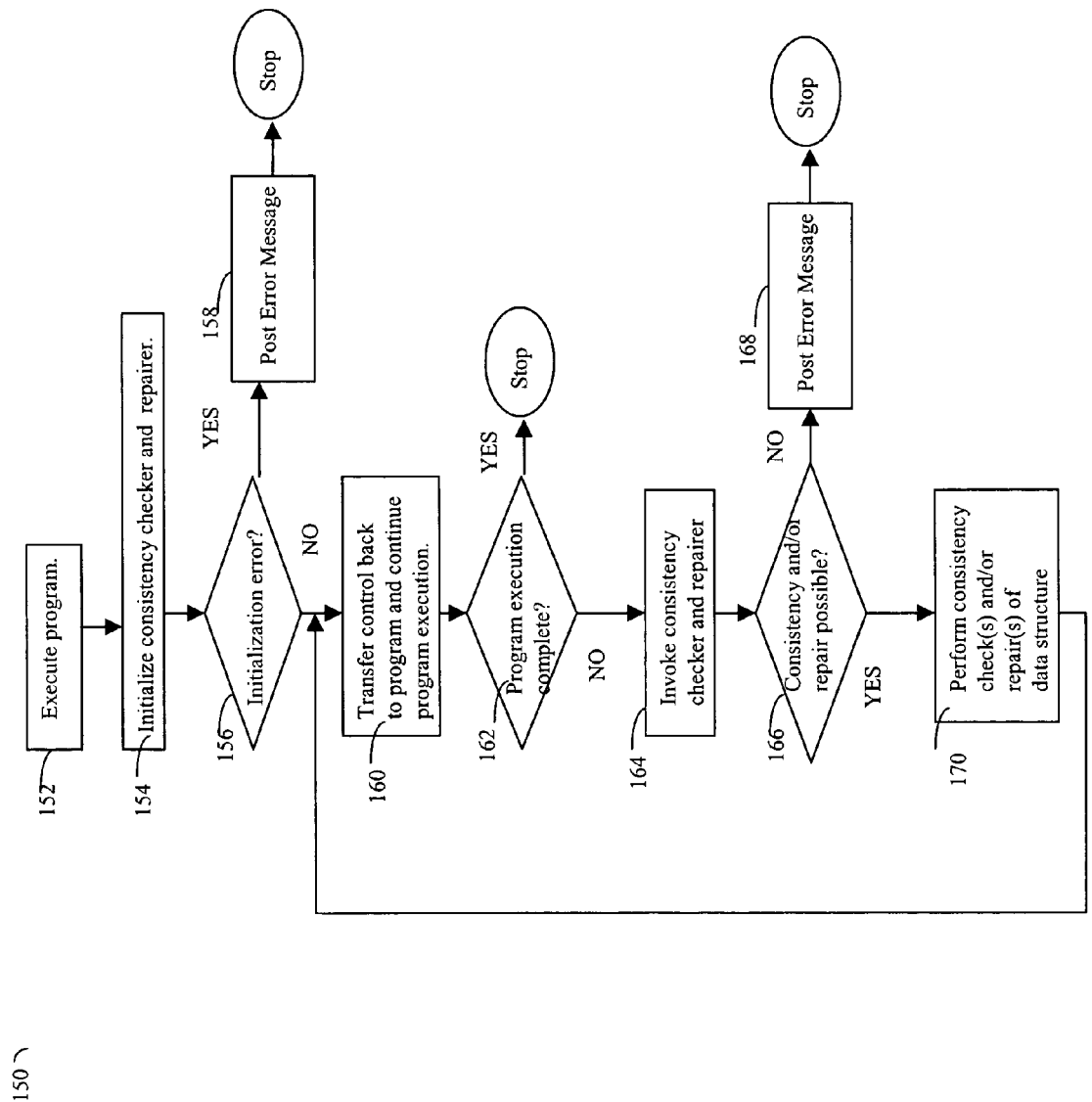
FIGS. 19-25 are flowcharts of processing steps that may be performed in an embodiment of the consistency checker and repairer.

Referring now to FIG. 19, shown is a flowchart 150 of steps of one embodiment as may be performed by the consistency checker and repairer as part of an interpretive system. In describing the steps of flowchart 150, reference is made to the elements of FIG. 4 described elsewhere herein. At step 152, the user program, such as program 114, may be executed. At step 154, the consistency checker and repairer is initialized. As described elsewhere herein, mechanisms may be used in connection with transferring control to the consistency checker and repairer for initialization prior to executing instructions within the program code 114*a* that may need the services of the consistency checker and repairer. Within the consistency checker and repairer, a determination is made as to whether an initialization error has occurred at step 156. If so, an error message may be posted at step 158 and execution of the program may stop. Alternatively, an embodiment may post the error message at step 158, for example, to a console, file, or other output location. The program may then continue execution without performing the consistency checking and repairing. At step 156, if no initialization error has occurred within the consistency checker and repairer, control proceeds to step 160 where control is transferred back to the program to continue execution.

At step 162, a determination is made as to whether the program execution is complete. If so, the program execution stops. Otherwise, the program execution continues until the consistency checker and repairer is invoked at step 164 to perform consistency checking and/or repairing of a data structure. It should be noted that any one of a variety of different techniques may be used in connection with invoking the consistency checker and repairer. For example, in one embodiment, the programmer may optionally make explicit calls at particular points within a program as to where consistency checking and/or repairing is desired. Other techniques for invoking the consistency and/or repair processing are described elsewhere herein. At step 166, it is determined whether a consistency and/or repair of the data structure is possible at step 166. If not, an error message may be posted to the program at step 168 and processing of the program may stop. Otherwise, if step 166 determines that the consistency and/or repair is possible, control proceeds to step 170 where the consistency check and/or repair of the data structure is made at step 170. Subsequently, control proceeds back to step 160 where program execution continues.

It should be noted that other techniques may be used in connection with invocation of the consistency checker and repairer to perform consistency and/or repair operations. For example, a program may catch signals, such as runtime exceptions and other programming conditions including, but not limited to, divide by zero errors, segmentation fault violations, and the like. Such faults may be caused by inconsistent data structures causing a signal handler to be invoked which may further invoke the consistency checker and repairer. Subsequently, control of the execution of the program may be returned or resumed at the nearest consistency point. It should be noted that an embodiment may also use both mechanisms; that is, a signal catcher or error handler as well as the explicit invocations of the consistency checker and repairer module within a same program.

It should be noted that these are just some of the ways in which the consistency checker and repairer and the functionality associated therewith may be invoked. Other embodiments may invoke the processing techniques of the consistency checker and repairer other than as described herein.

The foregoing processing steps of the flowchart 150 are described in more detail elsewhere herein.

Figure 20:
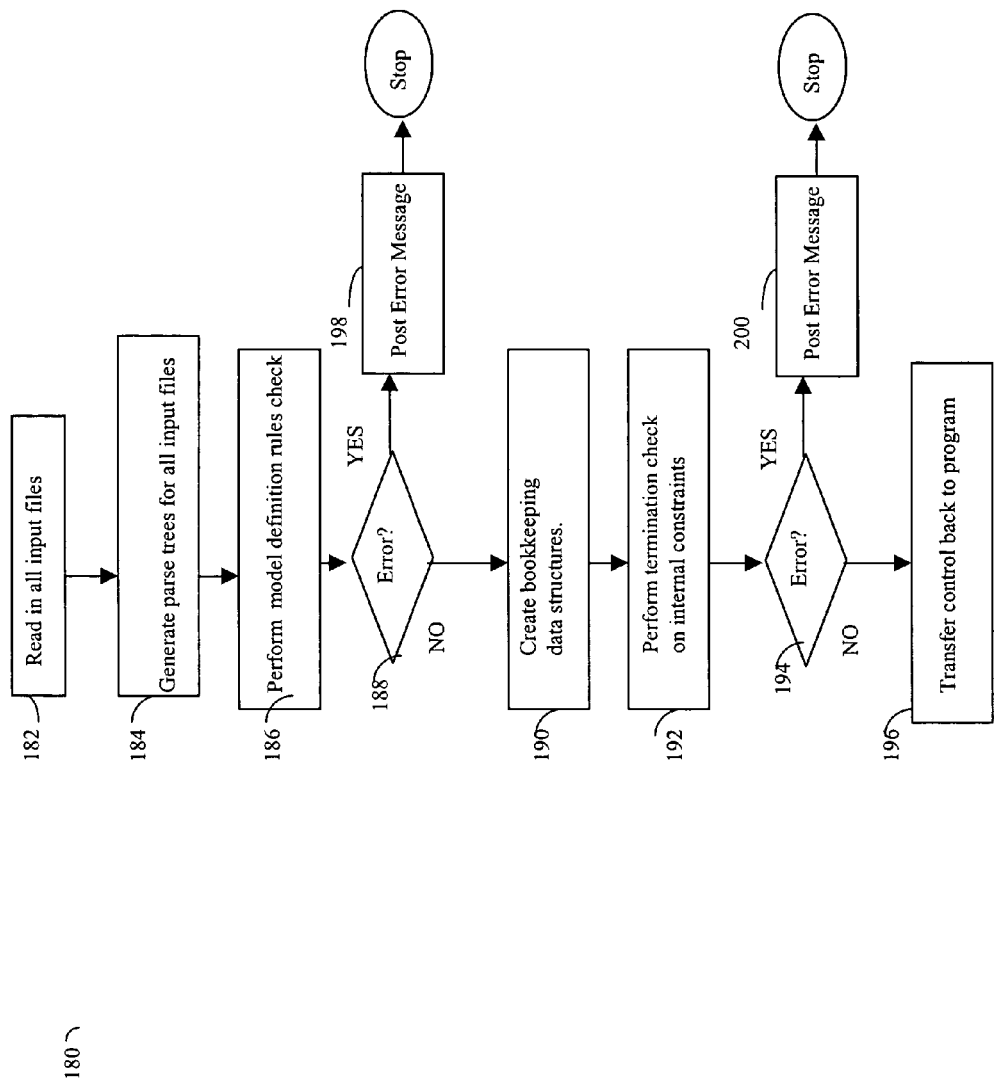

Referring now to FIG. 20, shown is a flowchart 180 of processing steps that may be performed by the consistency checker and repair module in connection with initialization. At step 182, all input files are read in by the consistency checker and repairer. It should be noted that all of the input files in this embodiment may refer to components 102, 104, 106, 108 and optionally components 110 and 120 as may be included in an embodiment. At step 184, parse trees are generated for all of the input files. It should be noted that parse trees and techniques for generation and maintenance thereof are generally known and described for example in "Modern Compiler Implementation in Java", by Andrew W. Appel and, Jens Palsberg.

Control proceeds to step 186 where model definition rules checking is performed. The model definition rules checking may determine whether the model definition rules used to construct the abstract model of the data structure from the concrete or program representation have cyclic dependencies involving negation. It should be noted that processing steps in one embodiment for performing model definition rules checking of step 186 are described elsewhere herein in more detail. At step 188, it is determined as to whether there has been an error in the model definition rules checking of step 186. If so, control proceeds to step 198 where an error message may be posted to the program, and program execution may stop. Otherwise, control may proceed from step 188 to step 190 where bookkeeping data structures may be created or allocated. The bookkeeping data structures created at step 190 are part of the initialization process where allocation may be performed of those data structures used in subsequent processing steps by the consistency checker and repairing functions described herein. For example, in connection with step 190, initialization of a memory map data structure may be performed. Use of a memory map is described elsewhere herein in connection with determining runtime memory allocation usage. At step 192, termination checking is performed on the internal constraints as specified in connection with the internal constraints input file. The processing performed at step 192 ensures that the repair system is capable of repairing the data structure in accordance with the specified internal constraints, and additionally, that the internal constraints specified are viable. It should be noted that step 190 is described elsewhere herein in more detail. At step 194, a determination is made as to whether an error has been encountered in connection with performing termination checking on the internal constraints. If so, control proceeds to step 200 where an error message may be posted and processing may stop. Otherwise, control proceeds to step 196 where control may be transferred back to the program.

What will now be described are more detailed processing steps of step 186 for performing model definition rules checking previously described in connection with the flowchart 180 of FIG. 20.

As described elsewhere herein, model rules in this embodiment may specify negation. An embodiment may perform model definition rules checking in order to avoid a possible infinite loop for use with fixed point computation processing by ensuring that the set of model definition rules specified have no cycles that go through rules with negated inclusion constraints in their guards. A rule dependence graph may be constructed and used in checking that the model definition rules have no cycles that go through rules with negated inclusion constraints in the guards. A graph may be constructed having a node for each rule in the set of model definition rules. A directed edge may be made between two rules if the inclusion constraint from the first rule has a set or relation used in the quantifiers or guard of a second rule. If the graph contains a cycle involving a rule with a negated inclusion constraint, the set of model definition rules may be characterized as not well founded and may be rejected. In other words, it may cause model definition rules checking to fail as determined at step 188. In contrast, if it is determined that the model definition rules do not have cycles as described above, the abstract model construction technique, described elsewhere herein, may be used subsequently to perform one fixed point computation for each strongly connected component in the rule dependence graph with the computations executed in an order compatible with the dependencies between the corresponding groups of rules.

Figure 21:
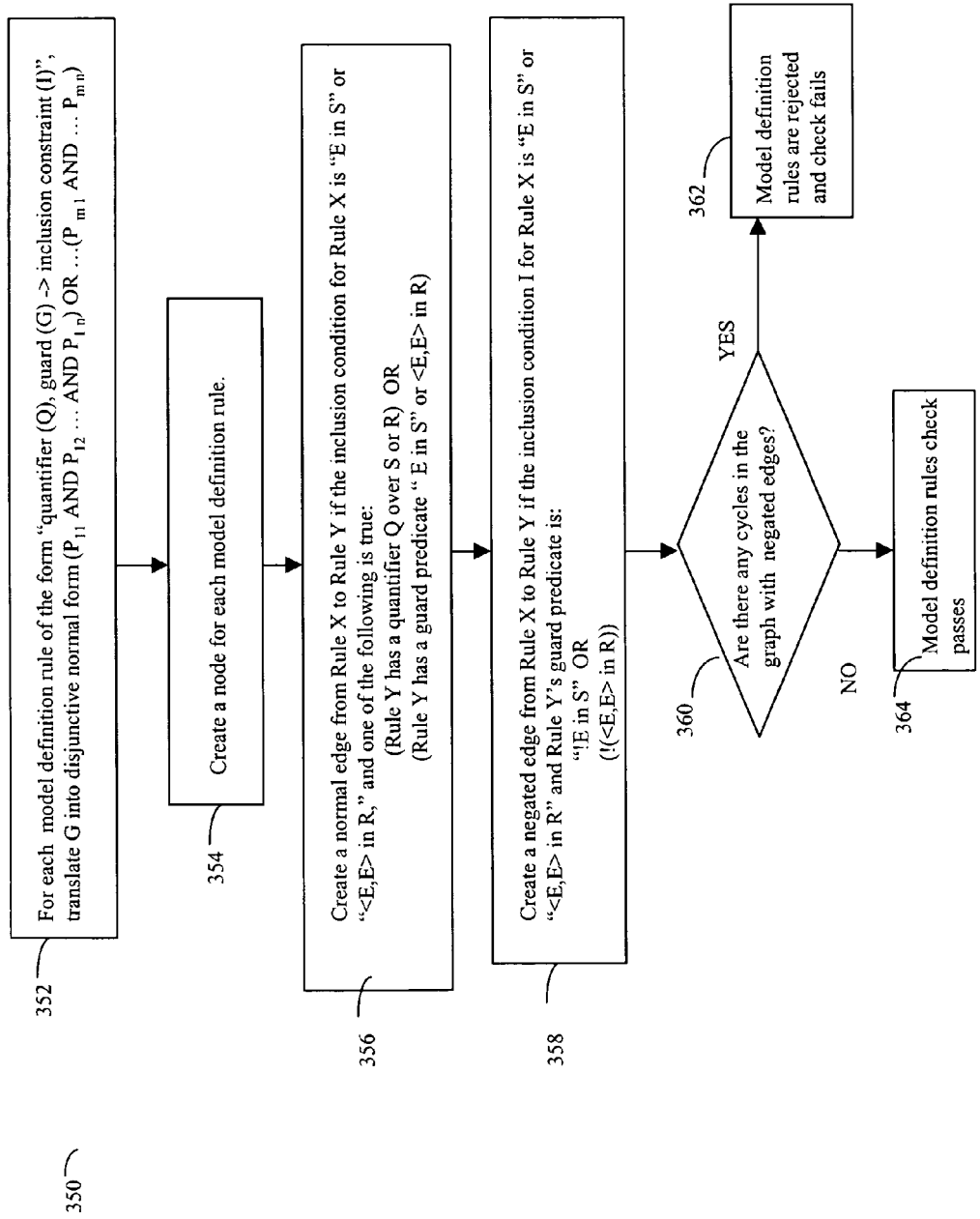

Referring now to FIG. 21, shown is a flowchart 350 of steps that may be performed in one embodiment for model definition rules checking. It should be noted that flowchart 350 sets forth more detail of the processing step 186 and 188 previously described in connection with flowchart 180 of FIG. 20.

As described elsewhere herein, each of the model definition rules may be of the form:
  quantifier, Q, guard, G–>inclusion constraint, I
where each I may be of the form:
  E in S or
  <E,E> in R.

At step 352, the guard, G, in each model definition rule of this form may be translated into disjunctive normal form (DNF) for one or more predicates, P, included in G such that G is of the DNF form represented as:

($P_{11}$ AND $P_{12}$ ... AND $P_{1n}$) OR ... ($P_{m1}$ AND ... $P_{mn}$)

where AND and OR represent logical operators.

The processing of flowchart 350 concerns detecting cycles in a graph with negated edges corresponding to an inclusion condition in a first rule which is negated in a guard of a second rule. To construct the graph, a node is created in the graph at step 354 for each model definition rule. Two types of edges are included in the graph. At step 356, a normal edge is created from each Rule X to each Rule Y if the inclusion condition for Rule X is "E in S" or "<E,E> in R," and one of the following is also true:

(Rule Y has a quantifier Q over S or R) OR
(Rule Y has a guard predicate "E in S" or <E,E> in R)

At step 358, a negated edge is create from each Rule X to each Rule Y if the inclusion condition I for Rule X is "E in S" or "<E,E> in R", and Rule Y's guard predicate is:

"!E in S" OR
(!(<E,E> in R))

At step 360, a determination is made as to whether there are any cycles in the graph just constructed with negated edges. If so, control proceeds to step 362 to conclude that the model definition rules are rejected and model definition rule checking has failed. Otherwise, control proceeds to step 364 where a determination is made that model definition rule checking has passed.

The foregoing is one technique that may be used in an embodiment to ensure that the model definition rules do not have cyclic dependencies which involve negation. An embodiment may also use other techniques in ensuring the model definition rules do not have cyclic dependencies which involve negation. An embodiment may alternatively restrict the input of the model definition rules in accordance with the foregoing condition. For example, an embodiment may be based on the grammar 130 as specified in of FIG. 10. However, the negation operation, as indicated by the use of "!", may not be allowed. An embodiment may also have another type of restriction on the input model definition rules also based on the grammar 130 of FIG. 10. However, in this instance, the use of negations may be restricted. One embodiment may use a restricted input solution such that the rules included in the embodiment are split into two groups. The first group cannot have negations of E in S or <E,E> in R. The second group includes negations of E in S or <E,E> in R if all rules that add elements (or tuples) to S (or R) appear in the first group.

What will now be described are techniques that may be used in an embodiment in performing a termination check on internal constraints as described elsewhere herein with step 192 processing of flowchart 180 of FIG. 20. Recall that in connection with step 192 processing, an embodiment may ensure that a data structure may be repaired and that the internal constraint language is viable. Termination checking performed in connection with internal constraints at step 192 eliminates the possibility that the repair technique described herein may not terminate because of a cyclic repair chain. In other words, a repair action for one basic proposition may falsify another proposition such that the repair technique described herein may not terminate because of the cyclic dependency of repairs.

Figure 22:
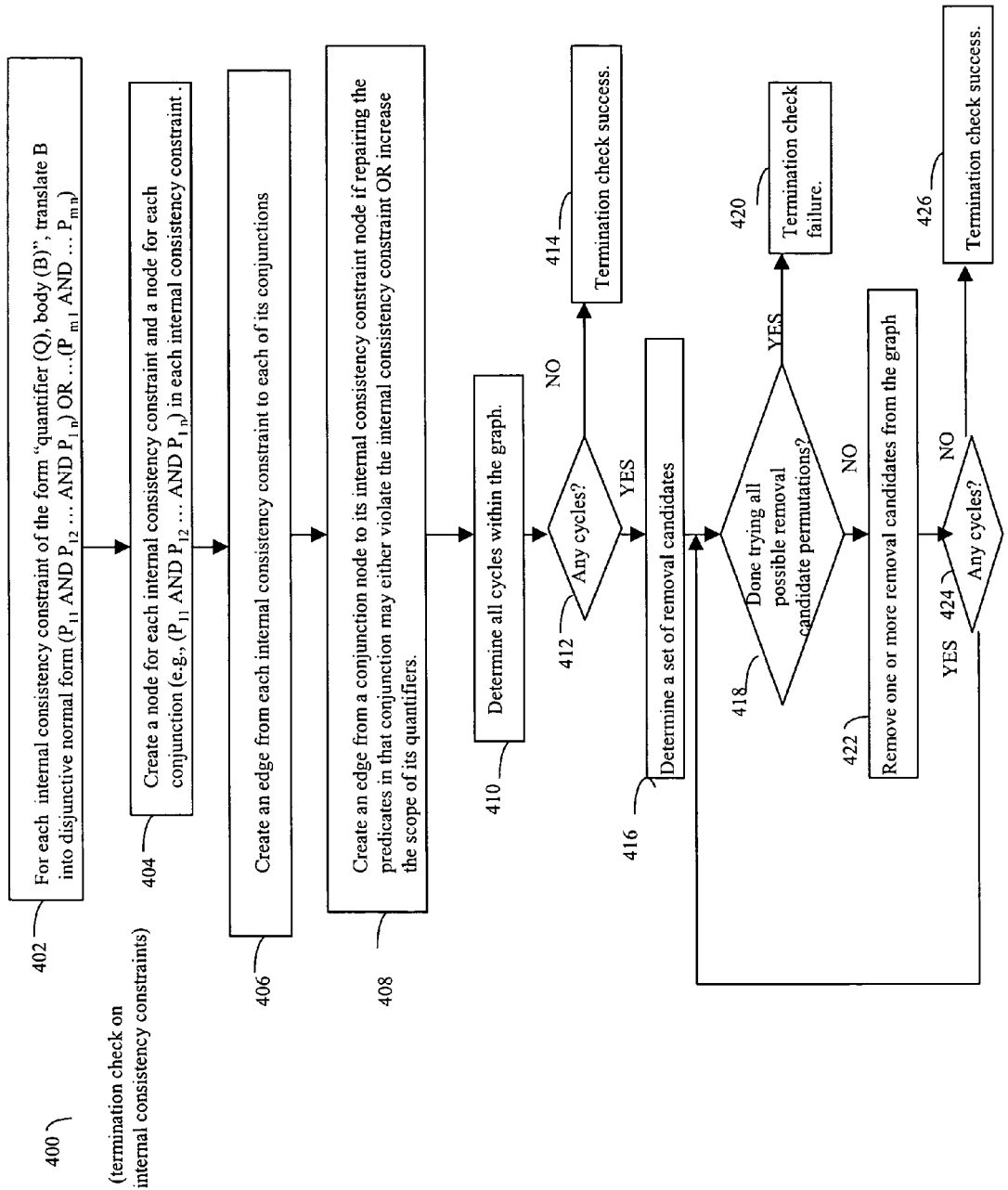

Referring now to FIG. 22, shown is a flowchart of one method that may be used in an embodiment in performing termination checking on internal consistency constraints. At step 402, for each internal consistency constraint of the form "quantifier (Q), body (B)", B may be translated into disjunctive normal form ($P_{11}$ AND $P_{12}$ ... AND $P_{1n}$) OR ... ($P_{m1}$ AND ... $P_{mn}$). A constraint dependence graph may be constructed. At step 404, a node is created for each internal consistency constraint and a node is created for each conjunction (e.g., (e.g., $P_{11}$ AND $P_{12}$ ... AND $P_{1n}$)) in each internal consistency constraint. At step 406, an edge is created from each node corresponding to a internal consistency constraint to each node of its conjunctions. At step 408, an edge is created from each conjunction node to its internal consistency constraint node if repairing the predicates (e.g., $P_{11}$) in that conjunction may either violate the internal consistency constraint, or increase the scope of its quantifiers. In other words, step 408 does not result in an edge from a conjunction J1 to a constraint X if, for each predicate P in conjunction J1 and each predicate P' in each conjunction of constraint X, repairs of each P do not violate P' and do not increase the scope of the quantifiers in constraint X. At step 410, a determination is made to identify all cycles in the graph just constructed. At step 412, a determination is made as to whether there are any cycles in the graph. If not, the graph is acycle and control proceeds to step 414 where it is concluded that the termination check is a success. Otherwise, control proceeds to step 416 to determine a set of removal candidates as all nodes corresponding to all conjunctions included in the cycles. Processing now tries to remove one or more candidates in order to try and produce an acyclic graph. At step 418, a determination is made as to whether all possible candidate permutations have been used. If so, control proceeds to step 420 where it is be concluded that termination checking has failed. Otherwise, control proceeds to step 422 to remove one or more removal candidates from the graph. At step 424, a determination is made as to whether the graph is now acyclic. If so, control proceeds to step 426 where it is concluded that termination checking has succeeded. Otherwise, control proceeds to step 418.

In one embodiment, candidates may be removed from the graph in successive iterations in accordance with different permutations of the set determined at step 416. For example, one embodiment may attempt to produce an acyclic graph by removing the first candidate from the set on a first iteration, a second candidate on a second iteration, and so on. Successive iterations may attempt to produce an acyclic graph by removing permutations of sets of two candidates on each iteration such as, for example, (1,2) on iteration "n", (1,3) on iteration "n+1", and so on. Successive iterations may then attempt to produce an acyclic graph by removing permutations of sets of three candidates, and so on, until all permutations are exhausted, or until an acyclic graph is produced. It should be noted that there is at least one conjunction in the resulting graph for each constraint such that a conjunction cannot be removed if removal results in an internal consistency constraint with no conjunctions. Other embodiments may use other techniques in pruning or removing nodes from the graph in an attempt to produce an acyclic graph.

Step 408 may be characterized as representing an edge when there is either an interference condition or an increase in quantifier scope. An interference condition exists if applying an action to satisfy one of the propositions in a conjunction may falsify one of the propositions in one of the conjunctions of the constraint. The interference is such that one proposition's repair may falsify a second proposition. An embodiment may first determine if two propositions involve disjoint parts of the model. If so, they do not interfere. However, if the two propositions involve the same objects and/or relations, the two may interfere with each other. If the repair action of the first leaves the model in a state that also satisfies the second proposition, then there is no interference. Thus, there is an edge in the graph from a conjunction to a constraint if one of the propositions of the conjunction interferes with one of the propositions of the constraint. As a result of step 408, there is also an edge from a conjunction to a constraint if repairing one of the propositions in the conjunction may add an object to a set or a tuple to a relation, and this addition may increase the scope of the quantifier in the constraint.

Once an acyclic graph has been determined, any candidates removed from the graph in order to make it acyclic are recorded to ensure that subsequent repair processing does not select to repair an inconsistency by satisfying that conjunction corresponding to the removed candidate. In other words, termination of the repair processing is conditional on a repair related to the removed candidates not being performed. It may not be possible to produce an acyclic graph in which case the foregoing processing indicates that termination checking has failed.

Figure 23:
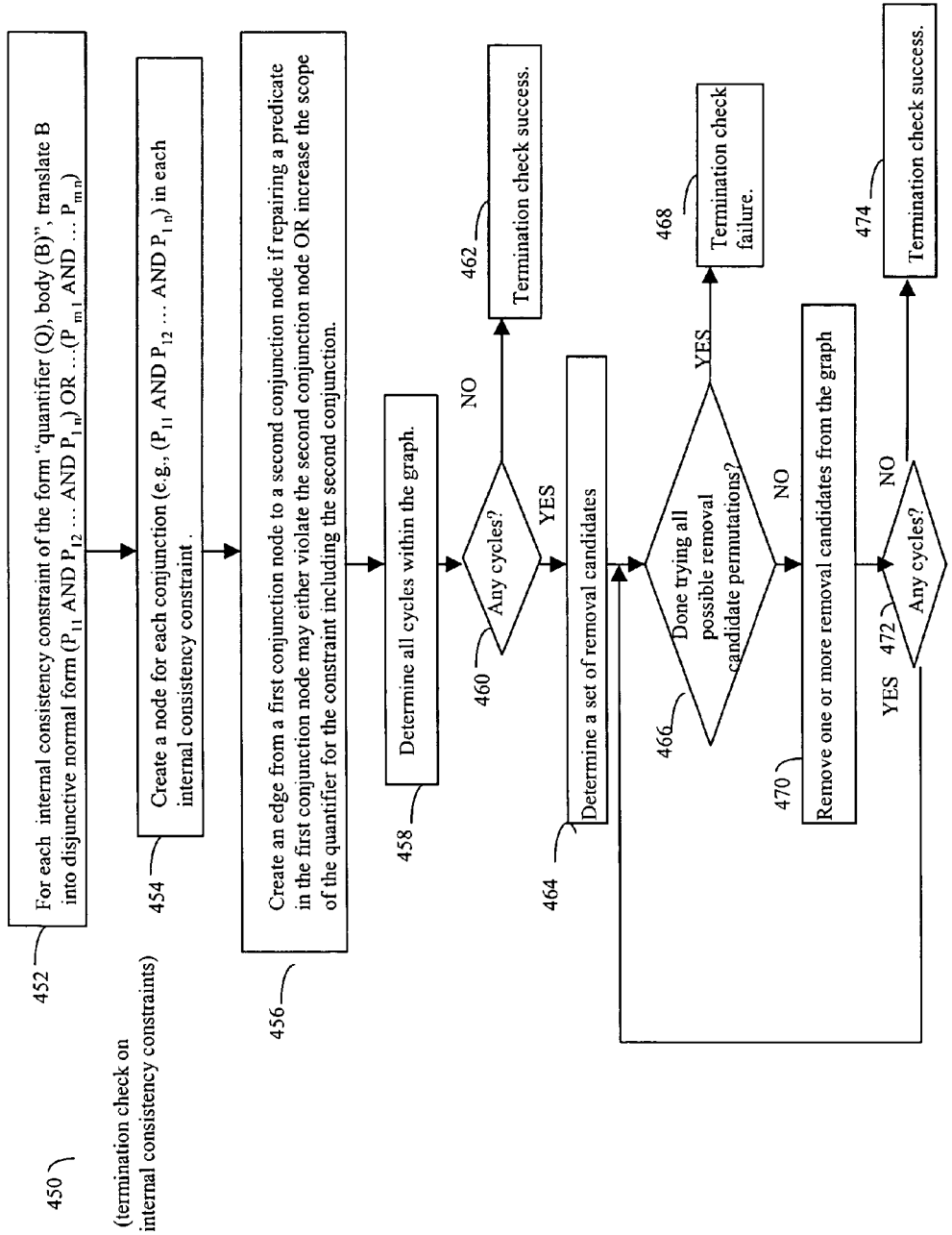
Figure 24:
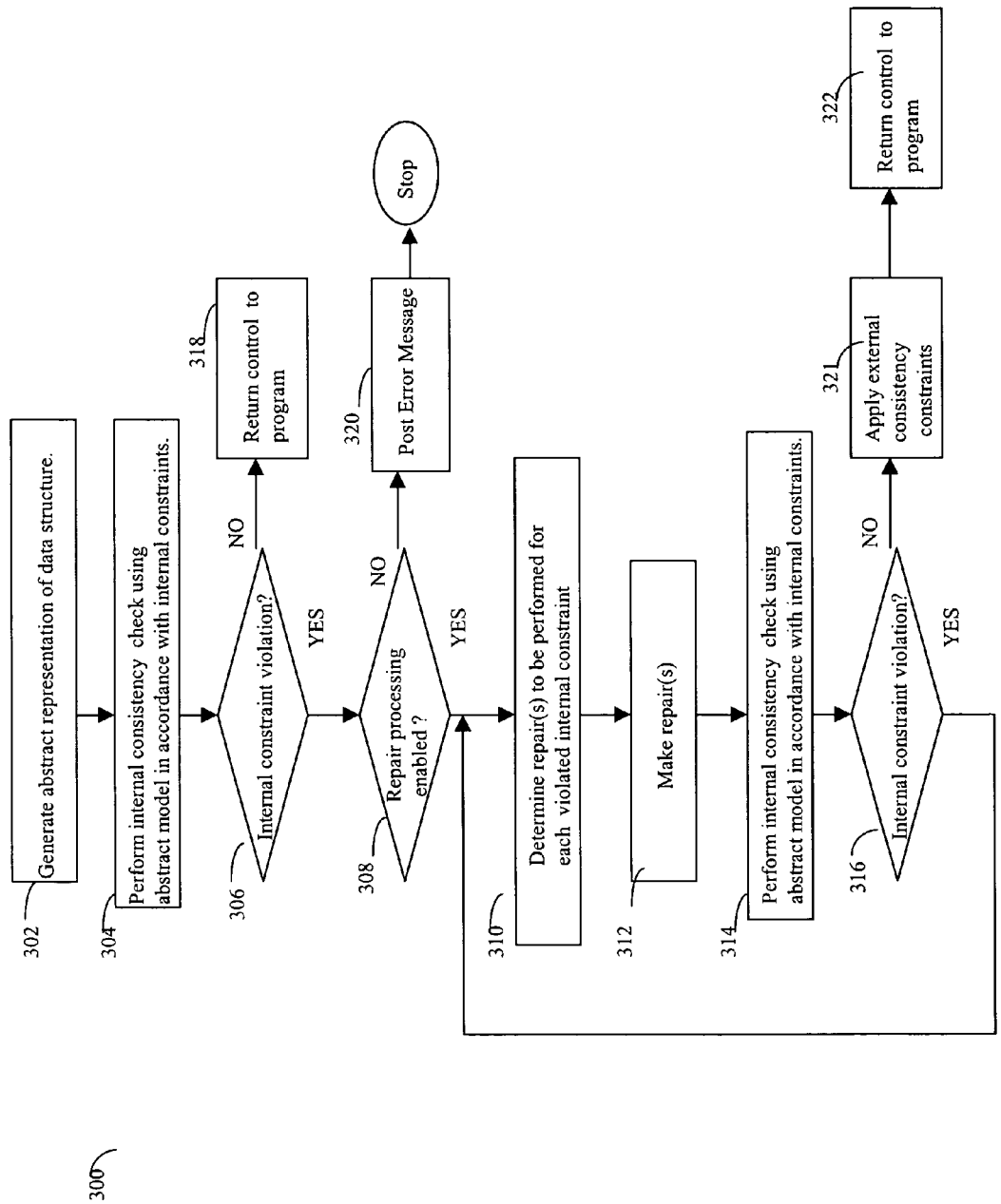

Referring now to FIG. 23, shown is a flowchart 450 of processing steps of another embodiment for performing the termination checking of the internal consistency constraints. An embodiment may perform the processing steps of 450 as an alternative to those processing steps of flowchart 400. At step 452, the internal consistency constraints are translated into DNF. At step 454, a node is created for each conjunction in each consistency constraint. At step 456, an edge is created from a first conjunction node to a second conjunction node if repairing a predicate in the first conjunction node may either violate the second conjunction node, OR increase the scope of the quantifier for the constraint including the second conjunction. Steps 458, 460, 462, 464, 466, 468, 470, 472, and 474 are similar, respectively, to steps 410, 412, 414, 416, 418, 420, 422, 424, and 426 described in connection with FIG. 22.

It should be noted that the graph produced as a result of executing the steps of flowchart 350 for model rules checking may be retained in an embodiment since it is used in constructing the abstract model for each particular instance of a concrete data structure as described elsewhere herein. The graph produced as a result of executing the steps of flowchart 400 or 450 may be discarded since it is not used in later processing steps. However, the set of removed conjunction nodes is retained for later processing as described herein.

Referring now to FIG. 21, shown is the flowchart 300 of steps of one embodiment that may be performed by the consistency check and repair module in connection with performing consistency checking and/or repairing of the data structure. The consistency checking processing may be invoked with an input parameter that is, for example, a pointer to the data structure for which consistency checking and/or repairing is to be performed. At step 302, the abstract representation of the data structure is generated using the model definition rules. Step 302 uses the graph constructed as a result of flowchart 350 processing. In constructing the abstract model for the instance of the concrete data structure passed as an input parameter, strongly connected components of the graph produced using flowchart 350 are determined and then topologically sorted. All the model definition rules in each strongly connected component are evaluated in accordance with the instance of the concrete data structure. A strongly connected component of a directed graph is a maximal set of vertices or nodes in which there is a path from any one vertex or node in the set to any other vertex in the set. It should be noted that strongly connected components of a graph and ways of determining the same are well known, for example, as described in "Introduction to Algorithms, Second Edition", by Thomas H. Cormen, Charles E. Leiserson, Ronald L. Rivest and, Clifford Stein.

In constructing the abstract model of one embodiment, the inputs are the set of model rules and the concrete data structure. The output is the abstract model which may be a collection of sets and relations as described elsewhere herein. Fixed point computation processing may be performed as part of constructing the abstract model. In fixed point computation processing, the set of model rules are continually evaluated until there are no changes to any sets or relations. The construction of the abstract model as may be performed in an embodiment may be represented by the following pseudo-code like representation:

```
changed =TRUE;
while changed = TRUE do
{
    changed = FALSE;
    evaluate all model rules in each strongly connected component of
        the graph produced using flowchart 350 processing steps and
        update existing abstract model;
    if there has been a change to any set or any relation then
        changed = TRUE;
}
```

Other embodiments may use other techniques in constructing the abstract model.

It should be noted that depending on the declared type in a structure declaration, an expression of the form "E.f" in a model definition rule may be a primitive value (in which case E.f denotes the value), a nested struct contained within E (in which case E.f denotes a reference to a nested struct), or a pointer (in which case E.f denotes a reference to the struct to which the pointer refers). For example, a doubly linked list constraint that following a "next" pointer of a first node to a second node and then the "previous" pointer for the second node should lead back to the first node may be expressed as:

[forall V1 in S1], [forall V2 in S2], V1.next=V2->V2.previous=V1.

An embodiment may include processing to detect invalid pointers during construction of the abstract model. An embodiment may use a memory map of information that has been gathered in accordance with previous memory allocation and deallocation. This memory map may be used in determining when a memory access is valid such as in connection with consistency checking.

In one embodiment, the memory management system may be instrumented to produce a trace or memory operations that allocate and deallocate memory. Such functions may include, for example, malloc, free, map, and munmap as may be used with the C programming language. Any one or more known systems and/or techniques are well known and may be used to instrument the necessary routines. Instrumentation techniques may be performed in a manner similar to that as used in existing software tools, such as, for example, IBM's Rational Purify, and as described in "Purify: Fast detection of memory leaks and access errors", in Proceedings of the Winter USENIX Conference, pages 125-136, 1992, by R. Hastings and B. Joyce.

In one embodiment, instrumentation may be performed, for example, by linking a program using a special version of a DLL or library containing a stub or wrapper routine for each of the memory allocation and deallocation routines. A call from the program to a memory management routine results in its corresponding wrapper function being invoked. The wrapper routine may perform data gathering prior to executing the real routine body of code, such as the real malloc code, in order to obtain the size of the memory allocation request. After the real routine body is executed, such as the real malloc function, control is returned to the wrapper and any additional data may be gathered, such as the address of the memory just allocated. The runtime tracing of the calls to these memory management routines may be augmented with information about the call stack and segments containing statically allocated data. The memory map may be constructed identifying valid and invalid regions of address space using the foregoing techniques. Subsequently, the model construction processing may check that each struct or other pointer access is valid prior to use.

In construction of the abstract model, an embodiment may ensure that all valid structs are completely within allocated memory. Additionally, an embodiment may ensure that if two structs overlap, one is completely contained within the other and that the declarations of both structs agree on the format of the overlapping memory portions. An embodiment may use any one or more data structures in storing the memory allocation and deallocation ranges. For example, one embodiment may use balanced interval trees in which each node in the tree corresponds to a range of memory allocated. Balanced interval trees, and other data structures that may be used, are well known as described, for example, in "Introduction to Algorithms, Second Edition", by Thomas H. Cormen, Charles E. Leiserson, Ronald L. Rivest and, Clifford Stein.

The abstract model construction processing of step 302 may also check expressions of the form E.f.g that may appear in guards. If E.f is not valid or defined, E.f.g is also considered to be undefined. Expressions involving undefined values may also be determined to have undefined values. In one embodiment, comparison (i.e., E1<E2) and set inclusion (i.e., E in S) predicates involving undefined values may use a special value of maybe such that a three-valued logic may be used in evaluating guards.

It should be noted that an embodiment of the abstract model construction processing may perform explicit pointer checks so that pointers are checked prior to referencing values using a pointer so that the model construction processing may traverse corrupted data structures without generating illegal accesses. Additionally, an embodiment may use a standard fixed point approach described above to avoid becoming involved in an infinite data structure traversal loop.

At step 304, an internal consistency check is performed using the constructed abstract model in accordance with the specified internal constraints. At step 304 processing, each of the internal constraints are evaluated using values specified for the particular data structure instance at run time. If any of the specified bodies of the internal constraints evaluate to false, there has been an internal constraint violation. At step 306, a determination is made as to whether any of the internal constraints have been violated. If not, control proceeds to step 318 where control is returned to the program for continued execution. Otherwise, in the event that an internal constraint violation has been detected at step 306, control proceeds to step 308 where a determination is made as to whether repair processing has been enabled. If not, control proceeds to step 320 to post an error message in accordance with the violated constraint and processing of the program may stop. At step 308, if repair processing is enabled, control proceeds within the consistency checker and repairer to repair the violated internal constraint or constraints. At step 310, the repairs are determined for each violated internal constraint. The violated internal consistency constraints and associated bindings causing the violation are known as a result of step 304 processing. These violated internal consistency constraints and associated bindings may be used as inputs for step 310 processing. It should be noted that the particular techniques used in connection with determining and evaluating which repair or repairs may be performed for a violated internal constraint are described in more detail elsewhere herein. At step 312, the repair is made with respect to the abstract data model and the internal constraint. It should be noted that in one embodiment, the processing of steps 310 and 312 may select a repair to be performed for each of the violated internal constraints. Since each repair may also violate another constraint, a check is again made at step 314 to perform an internal consistency check using the abstract model in accordance with the internal constraint(s). In other words, at step 314 each of the internal constraints is again evaluated with respect to the repair or repairs made at step 312. At step 316, if a determination is made that no internal constraint violation has occurred, control proceeds to step 321 to apply the external consistency constraints. At step 322 control may be returned back to the program.

If there has been an internal constraint violation detected at step 316, control again proceeds to step 310 to determine repair or repairs to be performed for each of the violated internal constraints. It should be noted that the processing of the loop formed by steps 310, 312, 314 and 316 is guaranteed to terminate since step 192 in this embodiment has previously determined that repairing internal constraints will eventually result in termination.

It should be noted that at step 321, all the external consistency constraints may be applied to effect repairs to the concrete data structure. The external consistency constraints may be used to translate the abstract model modifications to the concrete data structure prior to returning control to the executing program. If any of the external consistency constraints are determined to be violated, the concrete data structure value is also assigned the value as specified in the model value. In other words, the external consistency constraints are of the form: Q, G→C where C is either HE.field=E, HE.field[E]=E, or V=E (refer to FIG. 15). The repair computes the values of the E's from the abstract model, and assigns the field to that value.

It should be noted that since the external consistency constraints may be supplied by a user, it is possible that the external consistency constraints may impose multiple different values on a same structure value. Accordingly, it is recommended that an embodiment include at most one external constraint for each data structure value. An embodiment may also provide for automatic checking of external consistency constraints to ensure that the foregoing is true.

What will now be described are more detailed repair processing steps that may be performed in an embodiment. As described herein, the repair processing updates the abstract model and the concrete data structure so that all the internal and external constraints are satisfied. The repairing is performed in accordance with a set of repair actions selected that update the model and/or data structure so that propositions evaluate to true. In one embodiment, the repair processing has two phases: an internal phase in which updates are made to the abstract model to satisfy all internal consistency constraints; and an external phase in which updates are made to the concrete data structure to satisfy all external constraints. As described above, an internal consistency constraint violation at step 304 may be produced by evaluating the internal constraints in the context of the model iterating over all values of the quantified variables and evaluating the body of each constraint for each possible combination of values. If the body evaluates to false, an internal consistency constraint violation has occurred and step 304 produces a set of bindings for the quantified variables making the constraint false.

The repair processing in one embodiment uses as an input each of the bodies of internal consistency constraints evaluating to false and the variable bindings making that body false. The repair processing attempts to change the abstract model to make the body true. This may be done in one embodiment by first converting the body to DNF so that it consists of a disjunction of conjunctions of basic propositions. Each basic proposition has an associated repair action that the repair processing can use to modify the abstract model so that the basic proposition becomes true. The repair processing may select one of the conjunctions and apply the repair processing to its basic propositions until the conjunctions become true and the internal consistency constraint is satisfied for that set of variable bindings. In one embodiment, there may be three kinds of basic propositions in the internal consistency constraints in accordance with the associated grammar described elsewhere herein: size propositions, inequality propositions and inclusion propositions. Each proposition can occur with or without negation.

The repair processing that may be associated with each of the three types of basic propositions will now be described in more detail.

Size propositions are of the form "size(S)=C, !size(S)=C, size(S)>=C," or "size(S)<=C" where C is an integer constant and S can be one of the sets in the model or a relation expression of the form R.v or v.R. If S is a set in the model, the repair action may add or remove items to satisfy the constraint. The action ensures that these changes any partition constraints between model sets. This approach also may be used for negated size propositions. If S is a relation, the repair action adds or removes tuples from the relation to satisfy the constraint. The repair action may be a source of new items to add to sets to bring the number, for example, up to a size specified in the internal constraint. Any supersets of a set may be one possible source. For structs, memory allocation primitives may be another source. For other types, the action may synthesize new values. As described elsewhere herein, an embodiment may include a user specified option to allow a user to specify which source or sources to use rather than a default source that may be otherwise used in an embodiment.

It should be noted that an embodiment may determine a repair failure in the event that the system is unable to, for example, allocate a new struct, find a new value in a specified range, and the like. The model definition language described herein that may be used in an embodiment allows specification of a partition and subset inclusion constraints between different sets in the model. When items are changed in one set, an embodiment may appropriately update other sets to ensure that the model continues to satisfy these partitions and subset inclusion constraints. If S is a relation expression of the form R.v or v.R, the repair action may add or remove tuples to satisfy the internal consistency constraint. It should be noted that because the items in the tuples are part of the corresponding range and domain of the relation, a repair action that adds tuples to any relation may also add the items to the domain or range sets of the relation. Repair actions that add tuples to relations therefore may result in memory allocation errors, and other as described above in connection with adding items to sets.

Inequality propositions within an embodiment may be of the form: "V.R=E", !V.R=E", "V.R<E", "V.R<=E", "V.R>E", or "V.R>=E". The associated repair action may determine the value or E and then update V.R to be the closest value that satisfies the proposition.

Inclusion propositions within an embodiment may be of the form: "V in SE" where SE is a set in the model or a relation expression. The repair action may add or remove the value referenced by the label V to the set or the appropriate pair to the relation. This may be done in accordance with the partition and subsets specified in the model definition rules.

It may be the case the repair processing may select from multiple possible conjunctions to repair. An embodiment may use any one or more techniques in selecting one of a plurality of repairs. One embodiment may use a cost function to select a repair. The cost function may assign a cost to each repair action associated with repairing a conjunction. The total cost associated with a conjunction may be the sum of the repair costs for all unsatisfied or false basic propositions. The foregoing may be used to minimize the number of changes made to repair the model. An embodiment may also tune or select repair costs to discourage removal of objects from sets and tuples from relations in order to preserve as much information from the original data structure as possible.

Figure 25:
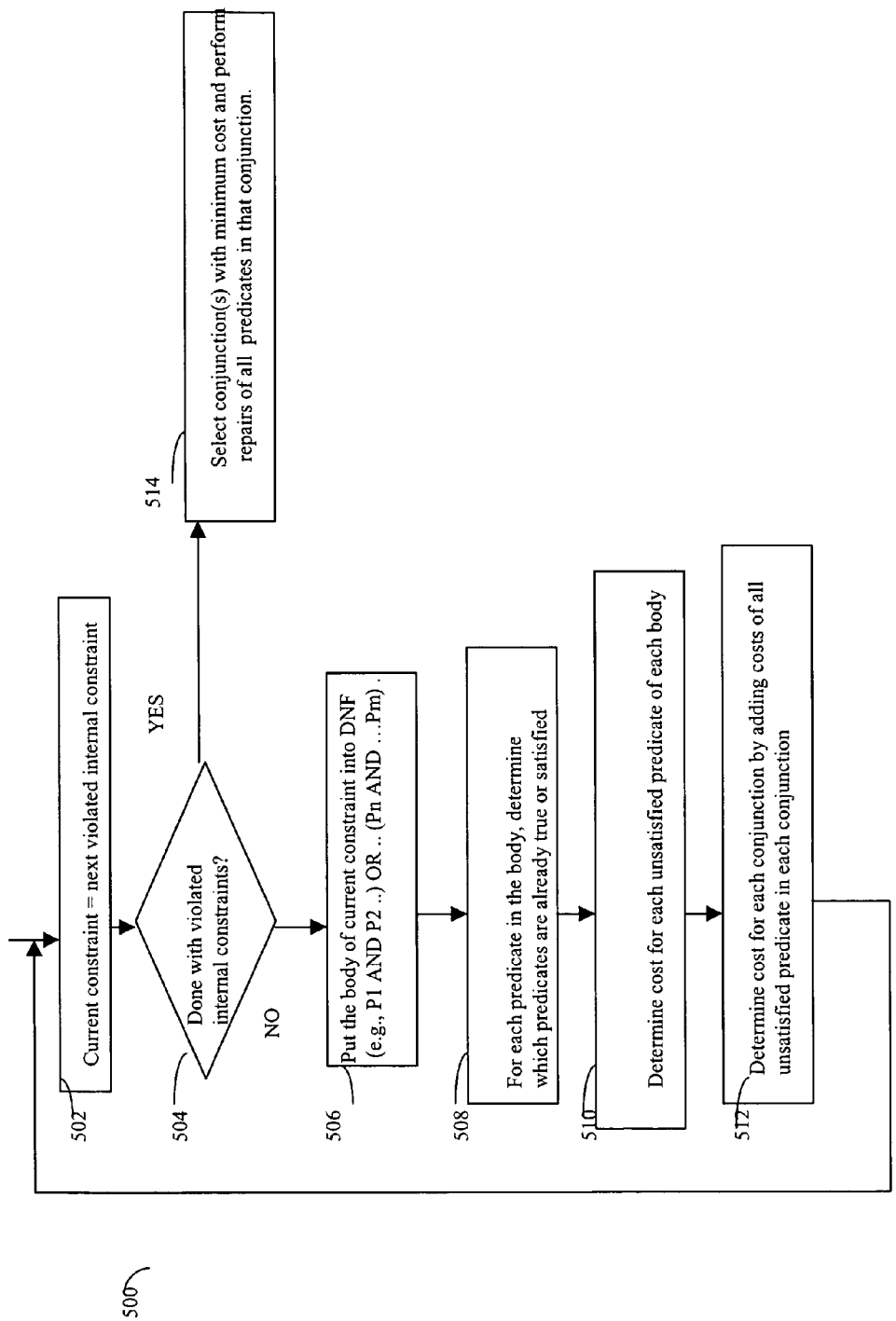

Referring now to FIG. 25, shown is a flowchart of processing steps that may be performed in an embodiment in selecting repair actions for the violated internal consistency constraints. The flowchart 500 summarizes the processing steps described above by iterating over all violated internal consistency constraints. At step 502, the current constraint is assigned the next violated internal consistency constraint. In a first iteration, this is the first violated internal consistency constraint. At step 504, a determination is made as to whether all violated internal constraints have been processed. If not, control proceeds to step 506 where the body of the current constraint is placed in DNF. At step 508, for each predicate in the body of the current constraint, determine which predicates are already true or unsatisfied. At step 510, a cost is determined for each unsatisfied predicate. At step 512, a cost is determined for each conjunction by summing the costs of all unsatisfied predicates therein. It should be noted that an embodiment of a cost function may perform the processing of steps 506, 508 510 and 512. The values associated with each predicate may be determined prior to execution. As described elsewhere herein, a user specified value may be specified using any one or more techniques including, for example, calling a user function, having the user specify explicit values in an input file, and the like. The particular costs of each repair action may vary in accordance with each embodiment. Higher costs may be associated with those repairs determined to be more costly or used to encourage selection of other repairs.

After step 512, control proceeds to step 502 to evaluate the next body that has evaluated to false. Once all violated internal consistency constraints have been processed, step 504 evaluates to yes and control proceeds to step 514 to select the conjunction(s) with the minimum cost and perform the associated repair(s).

It should be noted that the processing steps of flowchart 500 set forth in more detail the processing of steps 310, 312, and 314 that may be performed in an embodiment.

It should also be noted that an embodiment may select a conjunction to repair on a constraint by constraint basis. In other words, each constraint may be individually evaluated and the conjunction with the minimum cost for each constraint may be selected.

In connection with performing repair processing and other steps, an embodiment may include functionality that allows for user-specified control. For example, an embodiment may provide one or more mechanisms used in controlling actions taken with repair processing. As described herein, a cost function may be used in evaluating which particular repair may be made when there are one or more internal constraint violations. The configuration file 120 may be used in specifying a user defined cost function and/or cost values rather than rely on a default cost function and/or default costs that may be used in an embodiment of the consistency checker and repairer 116. In connection with this and other options, an embodiment may allow a user specified routine to be invoked to perform all or part of the functionality associated with a cost function. The user specified routine may specify particular cost values to be used by the consistency checker and repairer. Alternatively, the user specified routine may be passed as an input parameter a set of options and the user specified routine may return a subset of those choices which are determined as acceptable. An embodiment may also allow a user-specified routine to determine that no repair is necessary. An embodiment may also provide for a user-specified routine to be invoked to completely control the repair process, or some portion thereof, when a constraint violation is detected. When the user-specified routine ends, the consistency checker and repairer may verify that the constraint is satisfied, and, if not, may optionally invoke a standard repair routine.

The configuration file 120 may be used to specify where at run time new objects or structures may be allocated from. A repair action may involve allocating memory such as, for example, adding an object to a set, as described elsewhere herein. The user may specify a particular memory allocator or portion of memory to be used when allocating space for particular data types. In one embodiment, a first memory allocator may be used in allocating structures, and another memory allocator may be used for basic types, such as integers and booleans. An embodiment may provide a mechanism by which a user-specified routine or memory pool may be used in memory allocation operations such as the foregoing.

The configuration file 120 may also be used to specify repair actions in connection with a partitioned data set. For example, a repair action may add a new object to a set that is partitioned Accordingly, this new object is also added to one of the subsets of the partitioned data set. A user specified routine may be used to select a particular subset to which this new object is added. Similarly, when an object is removed from a set, a user-specified routine may be used to select one of the subsets if appropriate.

It should be noted that other embodiments may use the configuration file 120 in connection with specifying one or more of the foregoing as well as other options that may be used in connection with an embodiment performing consistency checking and/or repairing.

An embodiment may also provide for user specified control in connection with particular constraints. An embodiment may allow an internal constraint in the specification to be flagged as a critical constraint. In the event that the consistency checker and repairer detects that a critical constraint is violated, the consistency checker may alternatively suspend or terminate program execution. An embodiment may also allow for a user specified set of action(s) to be executed in the event that a critical constraint is violated. Such a mechanism may be used, for example, to provide a safe exit strategy rather than attempt to repair a data structure in accordance with specified constraints.

What will now be described are different ways in which a program may use the consistency checking and/or repair functionality described herein.

Figure 26:
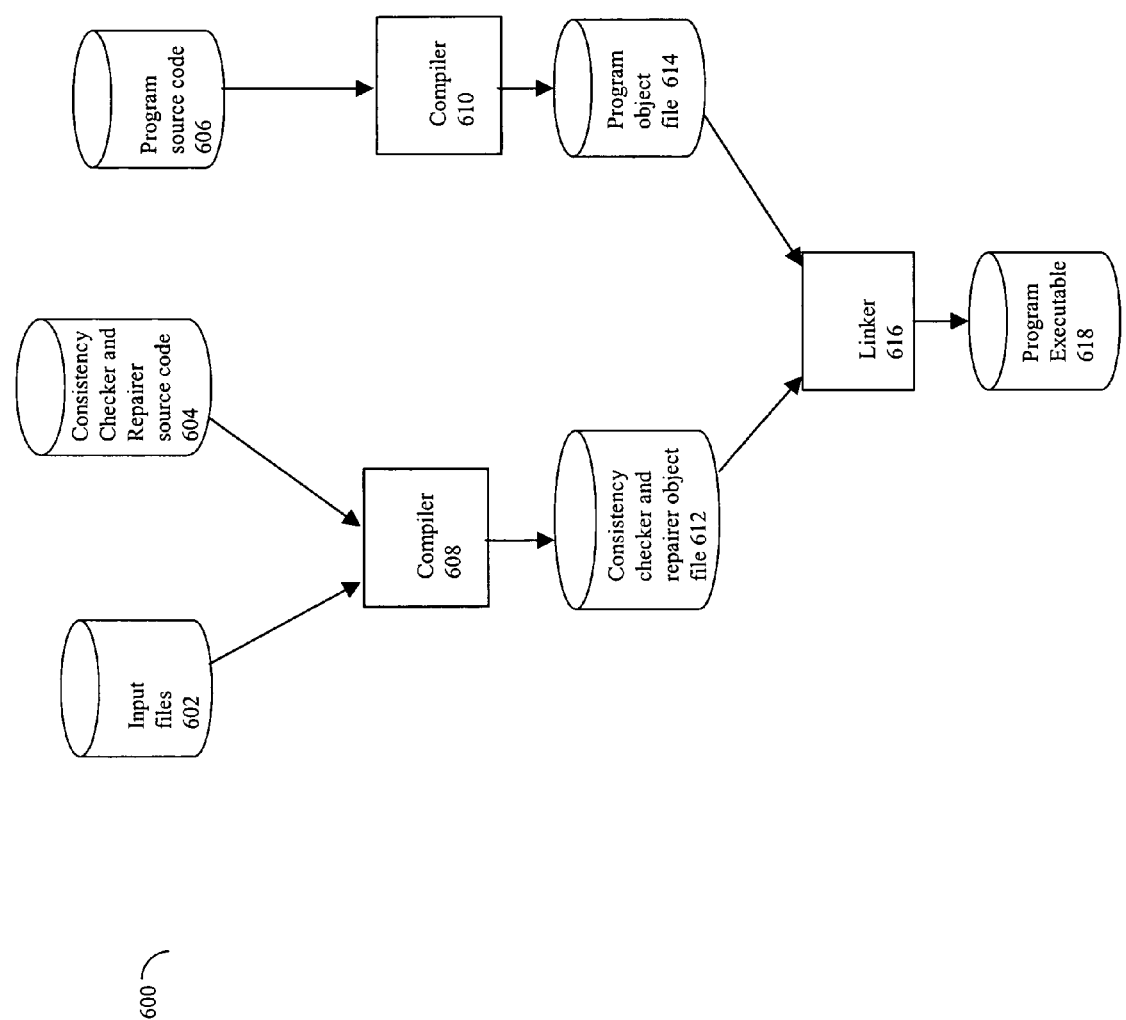
FIGS. 26-27 are example representations of how a program may be produced which uses consistency checking and repair functionality.

Referring now to FIG. 26, shown is an example 600 of how a program may be produced which uses the consistency checking and repair functionality described herein. The example 600 illustrates the data flow in connection with producing a program executable that may be executed at a later point to perform consistency checking and/or repairing. The example 600 uses a compiler 608 to compile the consistency checker and repairer source code 604 and the plurality of input files 602 used by the consistency checker and repairer. It should be noted that the input files 602 shown in the FIG. 1A may include the various input files described previously in connection with FIG. 4. The input file 602 shown in the illustration 600 may include, for example, elements 102, 104, 106, 108, 110, 112 and 120 previously described in connection with the illustration 100 of FIG. 4. The particular input files included in an embodiment may vary in accordance with how the data is stored, as well as, for example, whether a particular embodiment provides support for a configuration file 120. The source code 604 and input file or files 602 are compiled by the compiler 608 to produce the consistency checker and repairer object file 612. In this embodiment, the consistency checker and repairer object file operates in accordance with the one or more input files 602. In other words, the object file 612 performs the consistency checking and/or repairing in accordance with the particular instance of input files 602, such as, for example, in accordance with a particular set of constraints and data models. In the event that any one or more of the input files changes, the consistency checker and repairer object file is regenerated. The program object file 614 is produced by compiler 610 compiling the program source code 606. The program object file 614 and the consistency checker and repairer object file 612 may be linked by a linker 616 to produce the program executable 618. The example 600 may be used in connection with a system for consistency checking and/or repairing in which the different constraints and/or model rules are not expected to change frequently. The consistency checker and repairer object file may be characterized as bound to the particular instance of the input files 602.

Figure 27:
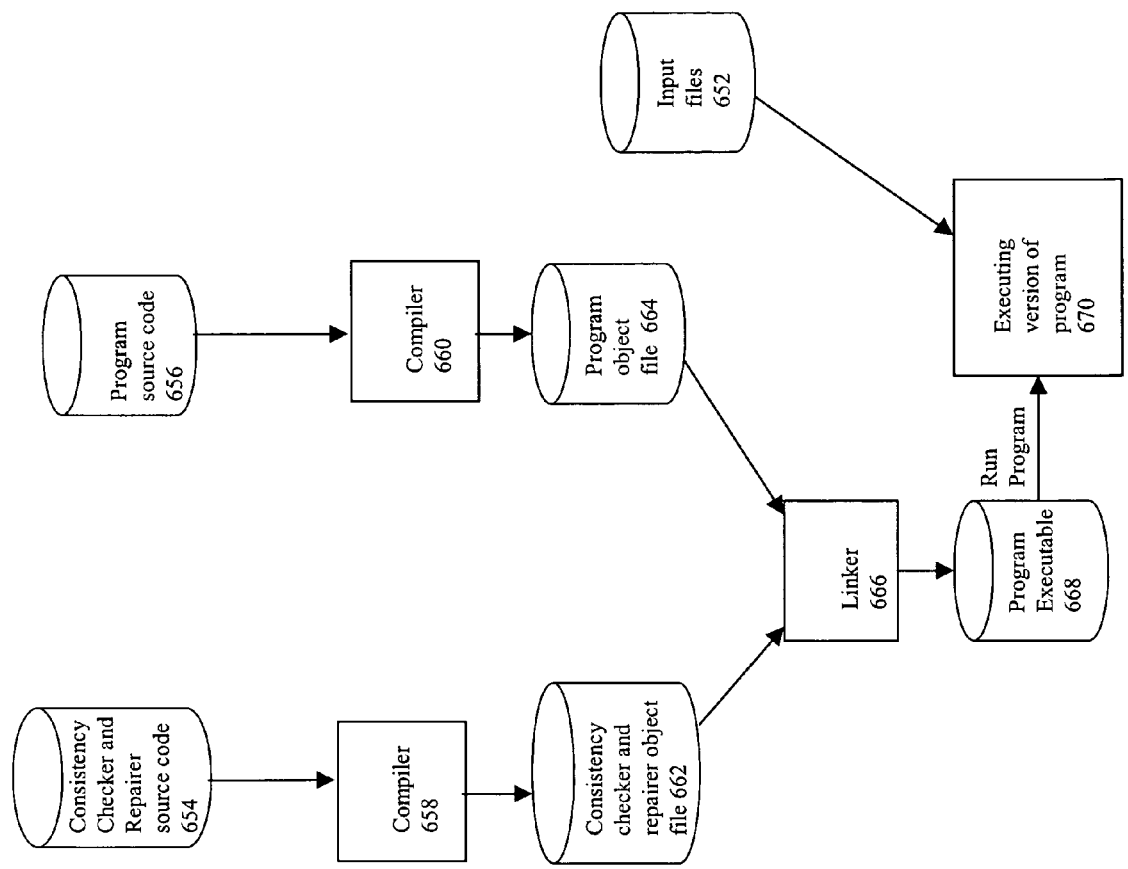

Referring now to FIG. 27, shown is an example 650 of another embodiment of the system in which the consistency checking and/or repairing functionality described herein may be used with a program. The consistency checker and repairer source code 654 is compiled by the compiler 658 to produce the consistency checker and repairer object file 662. Similarly, the program source code 656 is compiled by the compiler 660 to produce the program object file 664. The linker 666 is used to produce the program executable 668 using the object file 662 and 664. The program executable 668 may be executed at a later point in time such that there is an instance of the executing program 670 which reads in the one or more input files 652 at one time. The example 650 corresponds to one way in which an embodiment may produce the program 114 previously described in connection with the illustration 100 of FIG. 4. The illustration 650 reads at run time the one or more input files 652. In contrast, the example 600 uses a version of the consistency checker and repairer object file for one particular set of input files 602.

The example 650 or FIG. 27 may be used in an embodiment in which the input files are expected to change more frequently in comparison, for example, to an embodiment using the arrangement of FIG. 26.

An embodiment may also use a hybrid of the foregoing compiled model of FIG. 26 and the interpretive model of FIG. 27. An embodiment may use the compiled consistency checker to determine if data structures are consistent. If repairs are necessary, an interpreter may be executed and initialized to perform any repairs.

In connection with the foregoing techniques for detection and/or repair, an embodiment may perform model elision. In model elision, the specification may be analyzed to determine when it is possible to perform consistency checking directly on the concrete data structures as used by a program at run time without explicitly constructing an intermediate model. It should be noted that use of model elision may be used to eliminate or reduce computation time in memory overhead as may be associated with building the abstract model. Elimination of memory overhead may be important for use in embodiments with a limited amount of memory.

An embodiment may also perform incremental checking of the data structures designed for use with applications that may repeatedly execute consistency checks. In other words, an embodiment may perform an incremental checking technique rather than check a complete data structure each time the detection processing is invoked in an embodiment. An embodiment implementing incremental checking may track writes to the data structures and use this tracking information to check for consistency only those parts of a data structure whose consistency properties could have possibly changed since the last consistency check was performed.

An embodiment may perform complete checking of a data structure with each invocation of the consistency checking processing. An embodiment may also perform a distributed type of consistency check such that the consistency of a data structure checked at a first point in time checks those portions of the data structure accessed for use by a next section of code. The distributed checking may be viewed or characterized as the duality of incremental checking. Incremental checking checks only those parts of a data structure that a prior section of code has changed, while distributed checking checks only those portions of the data structure that a next section of code may read.

In connection with using the foregoing repair techniques, it may be desirable for an embodiment to characterize the effect of particular repairs set forth in accordance with specified constraints. An embodiment may determine the effect of a repair on particular aspects of a system. For example, analysis of the repair techniques used in accordance with a given specification may be able to provide a guarantee that repair actions specified may never remove an object from the set, never remove a pair from a relation, and the like. Such an analysis may also assure a developer, for example, that a repair in one portion of a system may not interfere with the operation of another part of a system, in order to understand the potential impact of using particular repairs on a data structure to eliminate certain classes of inconsistencies.

The repair techniques described herein maybe used in connection with providing an abstract model satisfying internal constraints and a combination of model and data structures that together satisfy the external constraints. In connection with the foregoing techniques, an internal constraint repair technique described herein may fail because of resource limitations, such as, for example, if the techniques described herein are unable to find an item or tuple to add to a set or relation, unable to allocate a new structure from memory, and so one. The external constraint repair techniques described herein may fail if the external constraints specify different values for the same data structure value. In this instance, the technique may produce a data structure with only one of the values.

As also described herein, static cyclicity checks described elsewhere herein may be performed to rule out other potential failure modes by eliminating the possibility of unsatisfiable specifications. The foregoing checks used in the techniques described herein may be used in an embodiment to prevent the expression of several classes of constraints. The foregoing checks, for example, rule out constraints involving ownership properties, as well as collections of constraints whose repair actions involve both insertions and removals from the same set or relation. For example, a specification may require that (1) every node in the list refer to a non-null element, and (2) every such element has at most one incoming reference from such a node. The repair action for a first constraint may choose an arbitrary element and make the empty list node refer to that element while the repair action for a second constraint may remove excess incoming references. With these repair actions, the constraint dependence graph contains a cycle and the static cyclicity checks performed elsewhere herein reject the internal consistency constraint(s). One way in which the foregoing may be extended to handle such constraints is to synthesize coarser granularity repair actions that cannot cause cascading constraint violations. For example with reference to the foregoing, it is possible to eliminate extra incoming references to list elements from list nodes by choosing a node where such a reference originates, allocating a new element, and then redirecting the new node to refer to the new element. This repair action removes excess incoming references without causing a node to fail to refer to some element. It, therefore, eliminates the interference between the two constraints removing cyclicity in the constraint dependence graph.

In one embodiment, it may be up to a developer to ensure that the specified external consistency constraints correctly translate the abstract model repairs back into concrete data structures. If a developer does not define external consistency constraints correctly, the repair algorithm may fail to leave a data structure in a consistent state. In particular, the reapplication of the model definition rules to the repaired state may fail to produce a consistent model. An embodiment may eliminate external consistency constraints by applying goal directed reasoning to the model definition rules to automatically translate model repairs back into data structure repairs. Such an extension may be included optionally in an embodiment and may simplify the specification and eliminate the possibility of a developer incorrectly specifying external constraints that fail to correctly translate model repairs back into data structures.

It should also be noted that an embodiment may allocate and store data structures which are part of an address space separate from that of an executing program, such as program 114. An embodiment may maintain separate address spaces for use with the data structures of an application distinct from those with a consistency checker and/or repairer because of the possibility that corruption of a repair and detection data structure may occur as a result of a programming anomaly performed by the executing program, such as the program 114. An embodiment may also handle the possibility of corruption of data structures used by the consistency and/or repair techniques described herein, for example, by recursively applying the data structure repair to the actual data structures used by the repair algorithm or techniques described herein. An embodiment may determine the particular constraints in accordance with a definition of the semantics of a particular language being used for the user program 114.

The techniques described herein may be used in any one or more of a wide variety of applications and uses. For example, the foregoing techniques may be called directly by a user at specified points within a program. An embodiment of a compiler may automatically generate code to perform consistency checking at various programming points. As described elsewhere herein, an embodiment may include both the automatic checking of consistencies as may be generated, for example, by a compiler with manual or purposeful invocation at specified points by a programmer in connection with an executing program. The foregoing techniques may also be used in connection with databases to develop integrity management systems.

An embodiment may use the techniques described herein in connection with persistent data structures such as, for example, may be stored in a file system. A program may be written using the techniques described herein that reads in the data structure from a persistent storage device, repairs any inconsistencies detected, and writes the data structure as repaired back out to the particular data storage device. This type of processing in connection with persistent data structures may execute independently of other applications that access a data structure. Alternatively, the use of the techniques described herein with persistent data structures may be integrated with other applications to perform the check and repair immediately after a data structure has been written out, and/or immediately before it is read back in.

As described herein, automatic generation of consistency checking may be used with an exception handler in an embodiment to find and eliminate consistency violations. An embodiment may use techniques that completely check a data structure at each invocation or some portion thereof as described herein.

It should be noted that in an embodiment performing repairs, once the repair is complete, program execution may resume at any one or more execution points. In one embodiment, program execution may resume where the program error was detected, at a next statement, or at a predetermined point for error recovery. The consistency checking and/or repairing may be invoked using a failure-based approach as well as in accordance with a particular transaction or operation. For example, checking and/or repairing may be performed at the start and/or end of a transaction, when data is read in and/or out, or in accordance with some other predetermined activity.

An embodiment may also include a technique, used alone or in combination with the consistency checking and/or repair processing described above, which enables a program to continue to execute through memory errors. In one embodiment, a C compiler may be used to generate code that dynamically detects invalid memory accesses. Instead of terminating program execution or throwing an exception, the generated code discards invalid writes and may select a valid value for use to return for invalid reads allowing the program to continue execution without a memory error. An invalid read may occur, for example, if an attempt is made to read an out of bounds array element, to use an invalid pointer to read a memory location, and the like. An invalid write may occur, for example, of an attempt is made to write a value to an out of bounds array element, or use an invalid pointer to write to a memory location.

The foregoing discarding of invalid writes and manufacturing of values to return for invalid reads may be used in connection with memory errors, such as out of bounds array accesses and invalid pointer accesses. Dynamic checks may be performed such that, prior to accessing a memory location, such as through a pointer, the validity of the pointer is checked. This may be determined using a memory map, for example, as described elsewhere herein. An embodiment may detect such types of invalid memory accesses before a statement is executed, for example, in a program to use such values. Once detected, the program may then perform an action in place of performing the memory access error, and continue execution. It should be noted that an embodiment may perform a check of a memory reference, such as used in connection with a read and/or write, prior to performing the operation. In the event that the memory reference is not valid, such as may be determined in accordance with memory allocations and deallocations of the executing program, an alternate action may be taken for each of an invalid read (return manufactured value) and an invalid write (ignore write operation).

In one embodiment, a compiler may be used to implement the foregoing. A compiler may generate checking code and continuation code. The checking code may detect the memory error and the continuation code may be executed when the checking code detects an attempt to perform an illegal memory access. The continuation code may, for example, discard erroneous write operations, and may manufacture a sequence of values used for erroneous read operations. It should be that in connection with erroneous write operations, the continuation code may also record erroneous writes in a memory area set aside for this purpose, output a message, or perform any other technique allowing the program to continue execution. An embodiment may instrument memory management routines, such as for memory allocation and deallocation, in order to obtain a memory map of valid memory addresses for an executing program. Additionally, a program and routines used by a program may be instrumented so that code using memory references, such as for pointer variables, pointer arithmetic, and arrays, checks the status of each pointer and array reference prior to attempting a memory access.

It should be noted that checking code and/or continuation code may be generated by a compiler or other language translator. The functionality of the checking code may also be performed using hardware, alone or in combination with, software. Additionally, the technique of automatically generating code to perform the foregoing is only an example of one embodiment using the techniques described herein and should not be construed as a limitation. An embodiment may also use an interrupt handler, implemented using hardware and/or software, in connection with detecting memory errors or invalid memory accesses. The embodiment's interrupt handler may cause transfer of control, directly or indirectly, to an error handler that may be implemented using hardware and/or software.

It should be noted that the foregoing describes an embodiment using consistency constraints including internal consistency constraints and/or external consistency constraints. Other embodiments may use other forms of consistency constraints in accordance with how a specification is expressed. For example, as also described above, an embodiment may express the consistency constraints in terms of the concrete data structures without using an abstract model. Such an embodiment may use different consistency constraints than as described herein.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for detecting an inconsistent data structure comprising:
receiving a specification describing at least one consistency constraint of a data structure; and
dynamically determining during execution of a program whether said data structure of said program violates said at least one consistency constraint, wherein said program is configured to perform said dynamically determining as part of consistency checking processing in accordance with one or more of: a signal handler that processes a detected fault, wherein, upon the occurrence of said detected fault, said signal handler is invoked and wherein said signal handler subsequently invokes said consistency checking processing, a consistency check of a portion of said data structure at a first execution point in accordance with either a previous usage of said portion or a subsequent usage of said portion within said program, or at least one user specified execution point of said program.

2. The method of claim 1, wherein said specification comprises at least one logical formula.

3. The method of claim 2, wherein said specification includes at least one consistency constraint expressed in terms of said data structure.

4. The method of claim 3, wherein said specification includes a description of said data structure.

5. The method of claim 1, further comprising:
representing said data structure as an abstract model; and
determining consistency constraint violations of said abstract model.

6. The method of claim 5, wherein said specification includes a description of said data structure.

7. The method of claim 6, wherein said specification includes an abstract model definition.

8. The method of claim 7, wherein said specification includes an internal constraint in terms of said abstract model definition.

9. The method of claim 8, further comprising:
determining if said internal constraint is violated in accordance with an evaluation of said internal constraint.

10. The method of claim 9, wherein said specification includes at least one external constraint mapping elements of said abstract model to elements of said data structure.

11. The method of claim 8, wherein said description of said abstract model includes at least one model definition rule and at least one declaration for one of: a set and a relation, said at least one model definition rule representing an element of said data structure in at least one of a set and a relation.

12. The method of claim 11, wherein said specification includes at least one external constraint mapping elements of said abstract model to elements of said data structure.

13. The method of claim 1, wherein said dynamically determining is performed in response to at least one of: an explicit call and a transfer of control to an error handler.

14. The method of claim 1, further comprising:
determining whether a memory reference in connection with said data structure is valid in accordance with currently allocated memory of said program.

15. The method of claim 1, further comprising:
repairing said data structure if said data structure violates said at least one consistency constraint.

16. A method for detecting an inconsistent data structure comprising:
receiving a specification describing at least one consistency constraint of a data structure; and
dynamically determining during execution of a program whether said data structure violates said at least one consistency constraint, wherein said specification comprises at least one logical formula, said specification includes at least one consistency constraint expressed in terms of said data structure, and
wherein, prior to dynamically determining whether said data structure violates said at least one consistency constraint, it is determined whether repairing the data structure according to the at least one consistency constraint will terminate.

17. The method of claim 16, wherein said specification includes a description of said data structure.

18. A method for detecting an inconsistent data structure comprising:
receiving a specification describing at least one consistency constraint of a data structure;
dynamically determining during execution of a program whether said data structure violates said at least one consistency constraint;
representing said data structure as an abstract model;
determining consistency constraint violations of said abstract model, wherein said specification includes a description of said data structure, said specification includes an abstract model definition, said specification includes an internal constraint in terms of said abstract model definition, and said description of said abstract model includes at least one model definition rule and at least one declaration for one of: a set and a relation, said at least one model definition rule representing an element of said data structure in at least one of a set and a relation; and wherein, prior to dynamically determining whether said data structure violates said at least one consistency constraint, it is determined whether construction of said abstract model will terminate.

19. The method of claim 18, wherein, prior to dynamically determining whether said data structure violates said at least one consistency constraint, it is determined whether said at least one model definition rule has cyclic dependencies which involve negation operators.

20. The method of claim 19, wherein said at least one model definition rule is of the form: quantifier, Q, guard, G, and an inclusion constraint, I, and the method further comprising:
translating each guard of each of said at least one model definition rule into disjunction normal form including a logical ORing of conjunctions, each of said conjunctions including one or more predicates;
constructing a graph representing said at least one model definition rule, said graph including a node for each model definition rule, a normal edge from a first rule to a second rule if the inclusion constraint for the first rule uses a set or relation which is also used in a guard of the second rule or a quantifier of the second rule, a negated edge from the first rule to the second rule if the inclusion constraint for the first rule uses a set or a relation which is negated in connection with one of a set or relation of the second rule's guard; and
determining if there are any cycles in said graph with negated edges.

21. A method for detecting an inconsistent data structure comprising:
receiving a specification describing at least one consistency constraint of a data structure; and
dynamically determining during execution of a program whether said data structure violates said at least one consistency constraint;
representing said data structure as an abstract model; and
determining consistency constraint violations of said abstract model, wherein said specification includes a description of said data structure; and
wherein, prior to dynamically determining whether said data structure violates said at least one consistency constraint, it is determined whether repairing said internal constraints will terminate.

22. A method of dynamically repairing an inconsistent data structure during program execution comprising:
receiving at least one inconsistency violation;
selecting a repair to correct said at least one inconsistency violation; and
repairing said inconsistent data structure; and
wherein said inconsistent data structure is represented in an abstract model, and the method comprising:
repairing said abstract model in accordance with an internal consistency constraint; and
applying a repair to the inconsistent data structure in accordance with an external constraint translating said repair from said abstract model to said inconsistent data structure.

23. A method of dynamically repairing an inconsistent data structure during program execution comprising:
receiving at least one inconsistency violation;
selecting a repair to correct said at least one inconsistency violation; and
repairing said inconsistent data structure;
selecting a repair from a plurality of repairs in accordance with a cost associated with each repair; and
wherein said inconsistency violation includes a plurality of conditions, and the method further comprising:
determining which of said plurality of conditions are true; and
determining a cost for repairing said inconsistency violation in accordance with those conditions that are not true.

24. A method of handling an invalid memory reference comprising:
determining whether a memory reference associated with an operation is invalid; and
if said memory reference is invalid, performing an action selected in accordance with a type of said operation, wherein said type includes at least one of a read operation or a write operation, wherein, when said action allows a program including said operation to continue executing, said action is a substitute action performed in place of said operation.

25. The method of claim 24, wherein said invalid memory access is determined during execution of said program.

26. The method of claim 24, wherein said action includes performing at least one of: no action at all, discarding said operation, reading a location other than a location specified by the invalid memory reference, writing to a location other than a location specified by the invalid memory reference, writing a value other than a value specified by the invalid memory reference, or supplying a default value.

27. The method of claim 24, wherein there are at least two actions and a first of said actions supplies a different value than a second of said actions.

28. A method of handling an invalid memory reference comprising:
determining whether a memory reference associated with an operation is invalid;
if said memory reference is invalid, performing a substitute action selected in accordance with said operation in place of performing said operation;
if said memory reference is associated with a read operation, supplying a default value as a result of performing said read operation; and
if said memory reference is associated with a write operation, disregarding said write operation.

29. The method of claim 28, wherein at least one invalid read operation has a different default value than at least one other invalid read operation.

30. The method of claim 29, wherein a program having an invalid memory reference continues execution following execution of said substitute action.

31. The method of claim 28, wherein said determining is performed in accordance with memory allocations associated with a program execution.

32. The method of claim 31, further comprising:
evaluating said memory reference prior to attempting to access a portion of memory.

33. The method of claim 32, wherein at least one of said read operation and said write operation uses one of: a pointer access, and an array element for said memory reference.

34. The method of claim 33, wherein a program having an invalid memory reference continues execution following execution of said substitute action.

35. A computer program product that detects an inconsistent data structure, the computer program product comprising executable code stored thereon for execution by a processor that:
receives a specification describing at least one consistency constraint of a data structure; and
dynamically determines during execution of a program whether said data structure of said program violates said at least one consistency constraint, wherein said program is configured to perform said dynamically determining as part of consistency checking processing in accordance with one or more of: a signal handler that processes a detected fault, wherein, upon the occurrence of said detected fault, said signal handler is invoked and wherein said signal handler subsequently invokes said consistency checking processing, a consistency check of a portion of said data structure at a first execution point in accordance with either a previous usage of said portion or a subsequent usage of said portion within said program, or at least one user specified execution point of said program.

36. The computer program product of claim 35, wherein said specification comprises at least one logical formula.

37. The computer program product of claim 36, wherein said specification includes at least one consistency constraint expressed in terms of said data structure.

38. The computer program product of claim 37, wherein said specification includes a description of said data structure.

39. The computer program product of claim 35, further comprising executable code that:
represents said data structure as an abstract model; and
determines consistency constraint violations of said abstract model.

40. The computer program product of claim 39, wherein said specification includes a description of said data structure.

41. The computer program product of claim 40, wherein said specification includes an abstract model definition.

42. The computer program product of claim 41, wherein said specification includes an internal constraint in terms of said abstract model definition.

43. The computer program product of claim 42, further comprising executable code that:
   determines if said internal constraint is violated in accordance with an evaluation of said internal constraint.

44. The computer program product of claim 43, wherein said specification includes at least one external constraint mapping elements of said abstract model to elements of said data structure.

45. The computer program product of claim 42, wherein said description of said abstract model includes at least one model definition rule and at least one declaration for one of: a set and a relation, said at least one model definition rule representing an element of said data structure in at least one of a set and a relation.

46. The computer program product of claim 45, wherein said specification includes at least one external constraint mapping elements of said abstract model to elements of said data structure.

47. The computer program product of claim 35, wherein said executable code that dynamically determines is responsive to at least one of: an explicit call and a transfer of control to an error handler.

48. The computer program product of claim 35, further comprising executable code that:
   determines whether a memory reference in connection with said data structure is valid in accordance with currently allocated memory of said program.

49. The computer program product of claim 35, further comprising executable code that:
   repairs said data structure if said data structure violates said at least one consistency constraint.

50. A computer program product that detects an inconsistent data structure, the computer program product comprising executable code stored thereon for execution by a processor that:
   receives a specification describing at least one consistency constraint of a data structure;
   dynamically determines during execution of a program whether said data structure violates said at least one consistency constraint, wherein said specification comprises at least one logical formula, said specification includes at least one consistency constraint expressed in terms of said data structure; and
   prior to dynamically determining whether said data structure violates said at least one consistency constraint, determines whether repairing the data structure according to the at least one consistency constraint will terminate.

51. The computer program product of claim 50, wherein said specification includes a description of said data structure.

52. A computer program product that detects an inconsistent data structure, the computer program product comprising executable code stored thereon for execution by a processor that:
   receives a specification describing at least one consistency constraint of a data structure;
   dynamically determines during execution of a program whether said data structure violates said at least one consistency constraint;
   represents said data structure as an abstract model;
   determines consistency constraint violations of said abstract model, wherein said specification includes a description of said data structure, said specification includes an abstract model definition, said specification includes an internal constraint in terms of said abstract model definition, said description of said abstract model includes at least one model definition rule and at least one declaration for one of: a set and a relation, said at least one model definition rule representing an element of said data structure in at least one of a set and a relation; and
   prior to dynamically determining whether said data structure violates said at least one consistency constraint, determines whether construction of said abstract model will terminate.

53. The computer program product of claim 52, further comprising executable code that, prior to dynamically determining whether said data structure violates said at least one consistency constraint, determines whether said at least one model definition rule has cyclic dependencies which involve negation operators.

54. The computer program product of claim 53, wherein said at least one model definition rule is of the form: quantifier, Q, guard, G, and an inclusion constraint, I, and the computer program product further comprising executable code that:
   translates each guard of each of said at least one model definition rule into disjunction normal form including a logical ORing of conjunctions, each of said conjunctions including one or more predicates;
   constructs a graph representing said at least one model definition rule, said graph including a node for each model definition rule, a normal edge from a first rule to a second rule if the inclusion constraint for the first rule uses a set or relation which is also used in a guard of the second rule or a quantifier of the second rule, a negated edge from the first rule to the second rule if the inclusion constraint for the first rule uses a set or a relation which is negated in connection with one of a set or relation of the second rule's guard; and
   determines if there are any cycles in said graph with negated edges.

55. A computer program product that detects an inconsistent data structure, the computer program product comprising executable code stored thereon for execution by a processor that:
   receives a specification describing at least one consistency constraint of a data structure;
   dynamically determines during execution of a program whether said data structure violates said at least one consistency constraint;
   represents said data structure as an abstract model; and
   determines consistency constraint violations of said abstract model, wherein said specification includes a description of said data structure; and
   prior to dynamically determining whether said data structure violates said at least one consistency constraint, determines whether repairing said internal constraints will terminate.

56. A computer program product that dynamically repairs an inconsistent data structure during program execution, the computer program product comprising executable code stored thereon for execution by a processor that:
   receives at least one inconsistency violation;
   selects a repair to correct said at least one inconsistency violation;
   repairs said inconsistent data structure; and wherein said inconsistent data structure is represented in an abstract model, and the computer program product comprising executable code that:

repairs said abstract model in accordance with an internal consistency constraint; and applies a repair to the inconsistent data structure in accordance with an external constraint translating said repair from said abstract model to said inconsistent data structure.

57. A computer program product that dynamically repairs an inconsistent data structure during program execution, the computer program product comprising executable code stored thereon for execution by a processor that:

receives at least one inconsistency violation;

selects a repair to correct said at least one inconsistency violation;

repairs said inconsistent data structure;

selects a repair from a plurality of repairs in accordance with a cost associated with each repair; and wherein said inconsistency violation includes a plurality of conditions, and the computer program product further comprising executable code that:

determines which of said plurality of conditions are true; and determines a cost for repairing said inconsistency violation in accordance with those conditions that are not true.

58. A computer program product that handles an invalid memory reference comprising executable code stored thereon for execution by a processor that:

determines whether a memory reference associated with an operation is invalid; and if said memory reference is invalid, performs an action selected in accordance with a type of said operation, wherein said type includes at least one of a read operation or a write operation, wherein, when said action allows a program including said operation to continue executing, said action is a substitute action performed in place of said operation.

59. The computer program product of claim 58, wherein said invalid memory access is determined during execution of said program.

60. The computer program product of claim 58, wherein said action includes performing at least one of: no action at all, discarding said operation, reading a location other than a location specified by the invalid memory reference, writing to a location other than a location specified by the invalid memory reference, writing a value other than a value specified by the invalid memory reference, or supplying a default value.

61. The computer program product of claim 58, wherein there are at least two actions and a first of said actions supplies a different value than a second of said actions.

62. A computer program product that handles an invalid memory reference comprising executable code stored thereon for execution by a processor that:

determines whether a memory reference associated with an operation is invalid; and if said memory reference is invalid, performs a substitute action selected in accordance with said operation in place of performing said operation;

if said memory reference is associated with a read operation, supplies a default value as a result of performing said read operation; and if said memory reference is associated with a write operation, disregards said write operation.

63. The computer program product of claim 62, wherein at least one invalid read operation has a different default value than at least one other invalid read operation.

64. The computer program product of claim 63, wherein a program having an invalid memory reference continues execution following execution of said substitute action.

65. The computer program product of claim 62, wherein said executable code that determines is performed in accordance with memory allocations associated with a program execution.

66. The computer program product of claim 65, further comprising executable code that:

evaluates said memory reference prior to attempting to access a portion of memory.

67. The computer program product of claim 66, wherein at least one of said read operation and said write operation uses one of: a pointer access, and an array element for said memory reference.

68. The computer program product of claim 66, wherein a program having an invalid memory reference continues execution following execution of said substitute action.

* * * * *